United States Patent
Wu et al.

(10) Patent No.: US 9,307,248 B2
(45) Date of Patent: Apr. 5, 2016

(54) IMAGE ENCODING METHOD AND APPARATUS FOR PERFORMING BIT-PLANE SCANNING CODING UPON PIXEL DATA AND RELATED IMAGE DECODING METHOD AND APPARATUS

(71) Applicant: MEDIATEK INC., Hsin-Chu (TW)

(72) Inventors: Tung-Hsing Wu, Chiayi (TW); Han-Liang Chou, Hsinchu County (TW); Kun-Bin Lee, Taipei (TW); Chi-Cheng Ju, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 47 days.

(21) Appl. No.: 14/183,537

(22) Filed: Feb. 19, 2014

(65) Prior Publication Data

US 2014/0254929 A1    Sep. 11, 2014

Related U.S. Application Data

(60) Provisional application No. 61/774,811, filed on Mar. 8, 2013.

(51) Int. Cl.
*G06K 9/00* (2006.01)
*H04N 19/132* (2014.01)
(Continued)

(52) U.S. Cl.
CPC ........... *H04N 19/132* (2014.11); *H04N 19/129* (2014.11); *H04N 19/146* (2014.11);
(Continued)

(58) Field of Classification Search
CPC ......... H04N 5/02; H04N 5/262; H04N 19/00; H04N 19/105; H04N 19/115; H04N 19/123; H04N 19/124; H04N 19/126; H04N 19/129; H04N 19/132; H04N 19/136; H04N 19/146; H04N 19/154; H04N 19/156; H04N 19/164; H04N 19/166; H04N 19/172; H04N 19/176; H04N 19/18; H04N 19/184; H04N 19/186; H04N 19/192; H04N 19/194; H04N 19/33; H04N 19/428; H04N 19/46; H04N 19/48; H04N 19/60; H04N 19/61; H04N 19/63; H04N 19/645; H04N 19/647; H04N 19/80; H04N 19/85; H04N 19/90; G06K 9/36; G06K 9/46; G09G 1/16; G09G 5/363; G09G 5/397; G06F 15/20

See application file for complete search history.

(56) References Cited

U.S. PATENT DOCUMENTS 6,909,811 B1    6/2005    Kajiwara
7,158,681 B2 *  1/2007    Persiantsev ............... 382/236
(Continued)

FOREIGN PATENT DOCUMENTS

CN    102396219 A    3/2012
CN    102396223 A    3/2012

OTHER PUBLICATIONS

"International Search Report" mailed on Jun. 11, 2014 for International application No. PCT/CN2014/073034, International filing date:Mar. 7, 2014.

*Primary Examiner* — Jose Couso
(74) *Attorney, Agent, or Firm* — Winston Hsu; Scott Margo

(57) ABSTRACT

An image encoding method includes at least following steps: receiving a plurality of target pixels within a frame, wherein pixel data of each target pixel has at least one color channel data corresponding to at least one color channel; determining a bit budget of the target pixels; and performing bit-plane scanning coding upon selected pixels according to the bit budget and a scanning order, and accordingly generating encoded pixel data of the selected pixels as encoded data of the target pixels, wherein the selected pixels are derived from the target pixels, and the bit-plane scanning coding extracts partial bits of pixel data of each selected pixel as encoded pixel data of the selected pixel. In addition, a corresponding image decoding method is provided.

32 Claims, 21 Drawing Sheets

(51) Int. Cl.
- H04N 19/129 (2014.01)
- H04N 19/186 (2014.01)
- H04N 19/146 (2014.01)
- H04N 19/182 (2014.01)
- H04N 19/184 (2014.01)
- H04N 19/59 (2014.01)
- H04N 19/80 (2014.01)

(52) U.S. Cl.
CPC ........... *H04N19/182* (2014.11); *H04N 19/184* (2014.11); *H04N 19/186* (2014.11); *H04N 19/59* (2014.11); *H04N 19/80* (2014.11)

(56) References Cited

U.S. PATENT DOCUMENTS

| 8,170,101 B2* | 5/2012 | Lei ........................... 375/240.03 |
| 2011/0033126 A1 | 2/2011 | Liu |
| 2012/0044990 A1* | 2/2012 | Bivolarsky et al. ...... 375/240.03 |

* cited by examiner (A)

(B)

IMAGE ENCODING METHOD AND APPARATUS FOR PERFORMING BIT-PLANE SCANNING CODING UPON PIXEL DATA AND RELATED IMAGE DECODING METHOD AND APPARATUS

CROSS REFERENCE TO RELATED APPLICATIONS

This application claims the benefit of U.S. provisional application No. 61/774,811, filed on Mar. 8, 2013 and incorporated herein by reference.

BACKGROUND

The disclosed embodiments of the present invention relate to image encoding and decoding, and more particularly, to an image encoding method and apparatus for performing bit-plane scanning coding upon pixel data and related image decoding method and apparatus.

A display interface may be disposed between a first chip and a second chip to transmit display data from the first chip to the second chip for further processing. For example, the first chip may be a host application processor, and the second chip may be a driver integrated circuit (IC). The display data may include image data, video data, graphic data, and/or OSD (on-screen display) data. Besides, the display data may be single view data for two-dimensional (2D) playback or multiple view data for three-dimensional (3D) playback. When a display panel supports a higher display resolution, 2D/3D playback with higher resolution can be realized. Hence, the display data transmitted over the display interface would have a larger data size/data rate, which increases the power consumption of the display interface inevitably. If the host application processor and the driver IC are both located at a portable device (e.g., a smartphone) powered by a battery device, the battery life is shortened due to the increased power consumption of the display interface.

Similarly, a camera interface may be disposed between a camera module and a post-processing chip to transmit camera data from the camera module to the post-processing chip for further processing. For example, the post-processing chip may be a host application processor. When the camera module supports a higher image resolution, the camera data transmitted over the camera interface would have a larger data size/data rate, which increases the power consumption of the camera interface inevitably. If the camera module and the host application processor are both located at a portable device (e.g., a smartphone) powered by a battery device, the battery life is shortened due to the increased power consumption of the camera interface.

Thus, there is a need for an innovative design which can effectively reduce the power consumption of the display/camera interface.

SUMMARY

In accordance with exemplary embodiments of the present invention, an image encoding method and apparatus for performing bit-plane scanning coding upon pixel data and related image decoding method and apparatus are proposed.

According to a first aspect of the present invention, an exemplary image encoding method is disclosed. The exemplary image encoding method includes: receiving a plurality of target pixels within a frame, wherein pixel data of each target pixel has at least one color channel data corresponding to at least one color channel; determining a bit budget of the target pixels; and performing bit-plane scanning coding upon selected pixels according to the bit budget and a scanning order, and accordingly generating encoded pixel data of the selected pixels as encoded data of the target pixels, wherein the selected pixels are derived from the target pixels, and the bit-plane scanning coding extracts partial bits of pixel data of each selected pixel as encoded pixel data of the selected pixel.

According to a second aspect of the present invention, an exemplary image decoding method is disclosed. The exemplary image decoding method includes: receiving an input bit-stream corresponding to a plurality of selected pixels; determining a bit budget of a plurality of target pixels within a frame, wherein the selected pixels are derived from the target pixels; and performing bit-plane scanning decoding upon the selected pixels according to the bit budget and a scanning order, and accordingly generating decoded pixel data of the target pixels based on decoded pixel data of the selected pixels, wherein decoded pixel data of each target pixel has at least one color channel data corresponding to at least one color channel, and the bit-plane scanning decoding at least fills partial bits of decoded pixel data of each selected pixel with encoded pixel data of the selected pixel.

According to a third aspect of the present invention, an exemplary image encoding apparatus is disclosed. The exemplary image encoding apparatus includes an input port and an encoder. The input port is arranged to receive a plurality of target pixels within a frame, wherein pixel data of each target pixel has at least one color channel data corresponding to at least one color channel. The encoder is arranged to determine a bit budget of the target pixels, and further arranged to perform bit-plane scanning coding upon selected pixels according to the bit budget and a scanning order, and accordingly generate encoded pixel data of the selected pixels as encoded data of the target pixels, wherein the selected pixels are derived from the target pixels, and the bit-plane scanning coding extracts partial bits of pixel data of each selected pixel as encoded pixel data of the selected pixel.

According to a fourth aspect of the present invention, an exemplary image decoding apparatus is disclosed. The exemplary image decoding apparatus includes an input port and a decoder. The input port is arranged to receive an input bit-stream corresponding to a plurality of selected pixels, wherein the selected pixels are derived from a plurality of target pixels within a frame. The decoder is arranged to determine a bit budget of the target pixels, and further arranged to perform bit-plane scanning decoding upon the selected pixels according to the bit budget and a scanning order, and accordingly generate decoded pixel data of the target pixels based on decoded pixel data of the selected pixels, wherein decoded pixel data of each target pixel has at least one color channel data corresponding to at least one color channel, and the bit-plane scanning decoding at least fills partial bits of decoded pixel data of each selected pixel with encoded pixel data of the selected pixel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
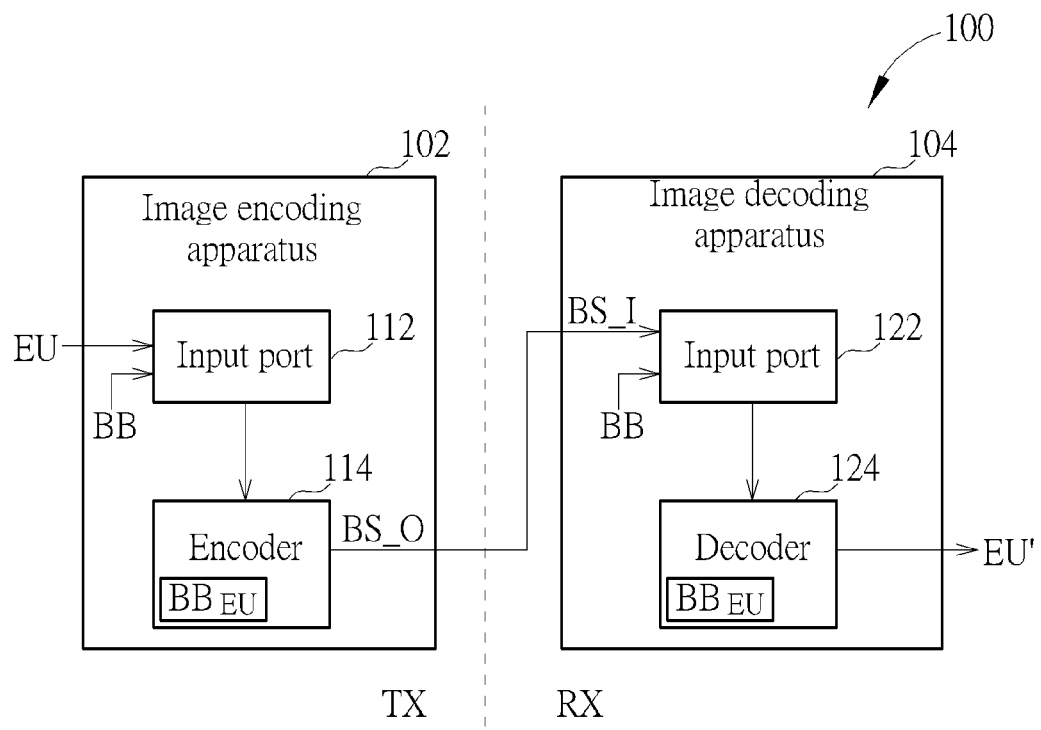
FIG. 1 is a diagram illustrating a data processing system according to an embodiment of the present invention.
Figure 3:
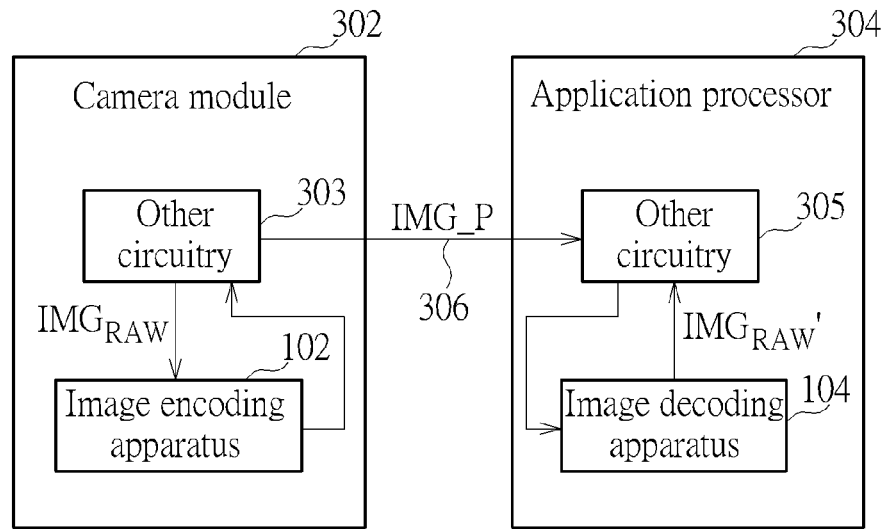
FIG. 3 is a diagram illustrating a second application which using the proposed data processing system.
Figure 4:
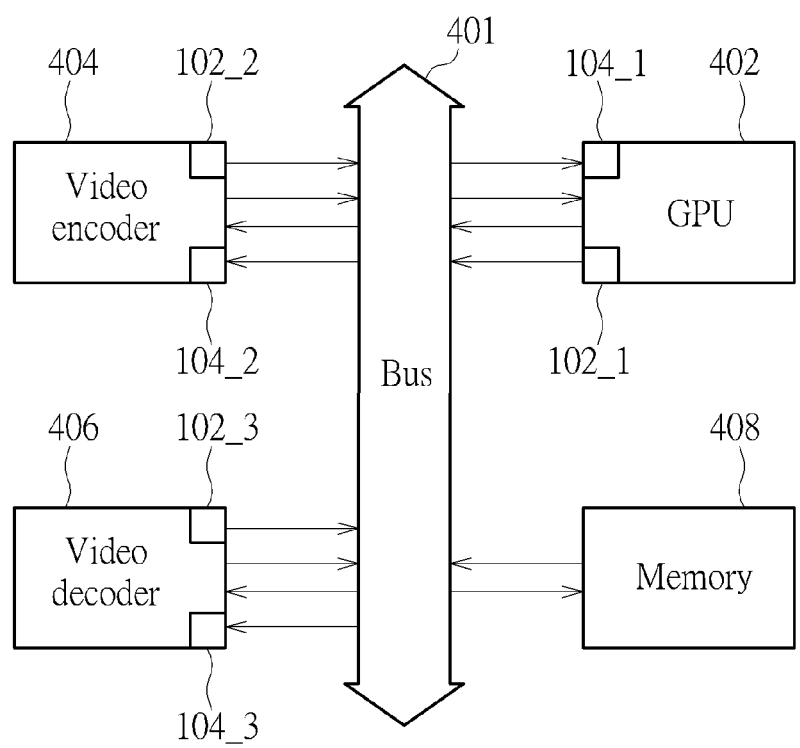
FIG. 4 is a diagram illustrating a third application which using the proposed data processing system.

FIG. 1 is a diagram illustrating a data processing system according to an embodiment of the present invention. The data processing system 100 includes an image encoding apparatus 102 and an image decoding apparatus 104, where the image encoding apparatus 102 is located at a transmitting end TX, and the image decoding apparatus 104 is located at a receiving end RX. The operation of each functional block included in the data processing system 100 will be detailed later. Several exemplary applications using the proposed data processing system 100 are illustrated in FIGS. 2-4 for illustrative purposes.

Figure 2:
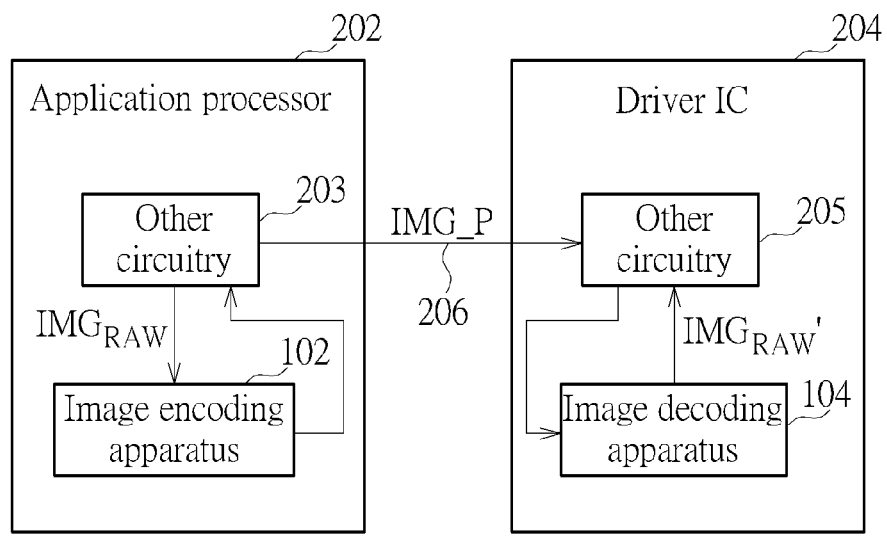
FIG. 2 is a diagram illustrating a first application which using the proposed data processing system.

FIG. 2 is a diagram illustrating a first application which using the proposed data processing system. An application processor 202 includes the image encoding apparatus 102 and other circuitry 203. A driver integrated circuit (IC) 204 has the image decoding apparatus 104 and other circuitry 205. The other circuitry 203 in the application processor 202 generates a raw image $IMG_{RAW}$ to the image encoding apparatus 102. The other circuitry 203 may apply pixel processing to the raw image $IMG_{RAW}$ before outputting the raw image $IMG_{RAW}$. The image encoding apparatus 102 is coupled to the other circuitry 203, and performs lossy/lossless image compression/encoding upon the raw image $IMG_{RAW}$ to generate an encoded image IMG_P, wherein the encoded image IMG_P is transmitted to a display interface 206 through the other circuitry 203. In a preferred embodiment of the present invention, the encoded image IMG_P is transmitted via an interleaved bit-stream. Besides, when a conventional image compression method is unable to make a size of compressed data of an encoding unit smaller than or equal to a designated bit budget of the encoding unit, the image encoding apparatus 102 activates a proposed bit-plane scanning coding method to generate encoded data of the encoding unit. The application processor 202 transmits the encoded image IMG_P to the driver IC 204 via the display interface 206. For example, the display interface 206 may be a display serial interface (DSI) standardized by a Mobile Industry Processor Interface (MIPI) or an embedded display port (eDP) standardized by a Video Electronics Standards Association (VESA).

The image decoding apparatus 104 receives the encoded image IMG_P from the display interface 206, and then transmits the encoded image IMG_P to the image decoding apparatus 104 through other circuitry 205. The image decoding apparatus 104 performs lossy/lossless decompression/decoding upon the encoded image IMG_P to recover a raw image $IMG_{RAW}'$, and transmits the raw image $IMG_{RAW}'$ to the other circuitry 205 for further processing. If a lossless compression/encoding algorithm is employed by the image encoding apparatus 102, the raw image $IMG_{RAW}'$ generated from a corresponding lossless decompression/decoding algorithm would be identical to the raw image $IMG_{RAW}$. However, if a lossy compression/encoding algorithm is employed by the image encoding apparatus 102, the raw image $IMG_{RAW}'$ generated from a corresponding lossy decompression/decoding may not be identical to the raw image $IMG_{RAW}$. Besides, when the proposed bit-plane scanning coding method is employed by the image encoding apparatus 102 to generate encoded data of an encoding unit, the image decoding apparatus 104 employs a corresponding bit-plane scanning decoding method to obtain decoded data of the encoding unit.

Compared to transmitting the raw image $IMG_{RAW}$ over the display interface 206 directly, transmitting the encoded image IMG_P over the display interface 206 has smaller data size/ lower data rate. Hence, the power consumption of the display interface 206 is reduced correspondingly. Moreover, the image encoding apparatus 102 is configured to generate an output bit-stream with an interleaved bit-stream structure. Hence, the buffer requirement of the driver IC 204 (i.e., the decoder-side buffer requirement) can be reduced, and the processing latency of obtaining decoded pixel data of one pixel is reduced due to reduced buffer overhead. Besides, the buffer requirement and processing latency of the application processor 202 are also reduced.

FIG. 3 is a diagram illustrating a second application which using the proposed data processing system. A camera module 302 includes the image encoding apparatus 102 and other circuitry 303. An application processor 304 has the image decoding apparatus 104 and other circuitry 305. The other circuitry 303 of the camera module 302 is coupled to the image encoding apparatus 102, and generates a raw image $IMG_{RAW}$ to the image encoding apparatus 102. The other circuitry 303 may apply pixel processing to the raw image $IMG_{RAW}$ before outputting the raw image $IMG_{RAW}$. The image encoding apparatus 102 performs lossy/lossless image compression/encoding upon the raw image $IMG_{RAW}$ to generate an encoded image IMG_P, where the encoded image IMG_P is transmitted to a camera interface 306 through the other circuitry 303. In a preferred embodiment of the present invention, the encoded image IMG_P is transmitted via an interleaved bit-stream. Besides, when a conventional image compression method is unable to make a size of compressed data of an encoding unit smaller than or equal to a designated bit budget of the encoding unit, the image encoding apparatus 102 activates the proposed bit-plane scanning coding method to generate encoded data of the encoding unit. The camera module 302 transmits the encoded image IMG_P to the application processor 304 via the camera interface 306. For example, the camera interface 306 may be a camera serial interface (CSI) standardized by a Mobile Industry Processor Interface (MIPI).

The application processor 304 receives the encoded image IMG_P from the camera interface 306, and then transmits the encoded image IMG_P to the image decoding apparatus 104 through other circuitry 305. The image decoding apparatus 104 performs lossy/lossless decompression/decoding upon the encoded image IMG_P to recover a raw image $IMG_{RAW}'$, and transmits the raw image $IMG_{RAW}'$ to the other circuitry 305 for further processing. If a lossless compression/encoding algorithm is employed by the image encoding apparatus 102, the raw image $IMG_{RAW}'$ generated from a corresponding lossless decompression/decoding algorithm would be identical to the raw image $IMG_{RAW}$. However, if a lossy compression/encoding algorithm is employed by the image encoding apparatus 102, the raw image $IMG_{RAW}'$ generated from a corresponding lossy decompression/decoding may not be identical to the raw image $IMG_{RAW}$. Besides, when the proposed bit-plane scanning coding method is employed by the image encoding apparatus 102 to generate encoded data of an encoding unit, the image decoding apparatus 104 employs a corresponding bit-plane scanning decoding method to obtain decoded data of the encoding unit.

Similarly, compared to transmitting the raw image $IMG_{RAW}$ over the camera interface 306 directly, transmitting the encoded image IMG_P over the camera interface 306 has smaller data size/lower data rate. Hence, the power consumption of the camera interface 306 is reduced correspondingly. Moreover, the image encoding apparatus 102 is configured to generate an output bit-stream with an interleaved bit-stream structure. Hence, the buffer requirement of the application processor 304 (i.e., the decoder-side buffer requirement) can be reduced, and the processing latency of obtaining decoded pixel data of one pixel is reduced due to reduced buffer overhead. Besides, the buffer requirement and processing latency of the camera module 302 are also reduced.

FIG. 4 is a diagram illustrating a third application which using the proposed data processing system. In this embodiment, the proposed data processing system is employed by a graphics platform having, for example, a graphics processing unit (GPU) 402, a video encoder 404, a video decoder 406 and a memory 408. The GPU 402, video encoder 404, video decoder 406 and memory 408 communicate with one another through a bus 401. Each of the GPU 402, video encoder 404 and video decoder 406 is equipped with an image encoding apparatus 102_1/102_2/102_3 and an image decoding apparatus 104_1/104_2/104_3. As encoded images are transmitted through the bus 401, the bandwidth of the bus 401 can be reduced. Preferably, the image encoding apparatus 102_1/102_2/102_3 is further configured to generate an output bit-stream with an interleaved bit-stream structure. In this way, the decoder-side buffer requirement can be reduced, and the decoder-side processing latency of obtaining decoded pixel data of one pixel is reduced due to reduced buffer overhead. Besides, the encoder-side buffer requirement and processing latency are also reduced.

Figure 5:
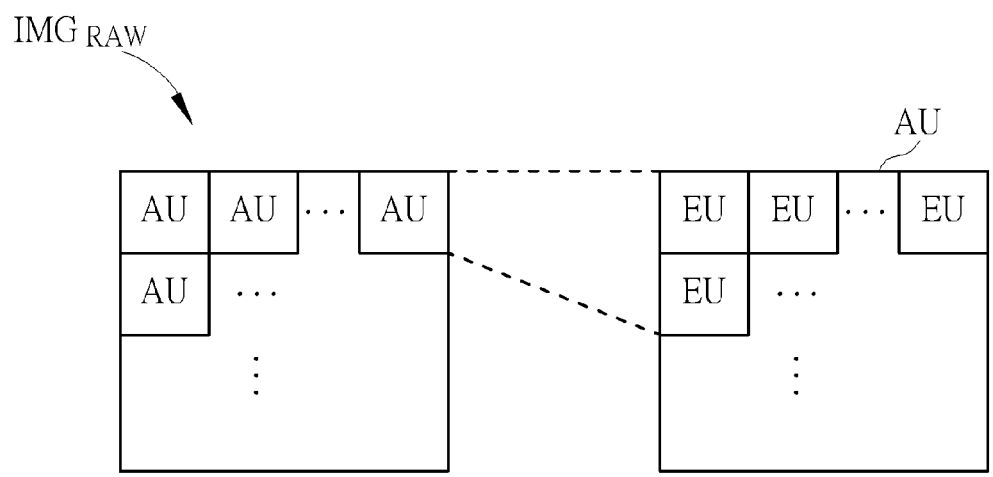
FIG. 5 is a diagram illustrating the relationship between access units and encoding units within one raw image.

As mentioned above, the image encoding apparatus may employ the proposed bit-plane scanning coding method which is capable of ensuring that a size of encoded data of an encoding unit is equal to and smaller than a designated bit budget for the encoding unit. Please refer to FIG. 5, which is a diagram illustrating the relationship between access units and encoding units within one raw image. As can be seen from FIG. 5, the raw image $IMG_{RAW}$ is partitioned into at least one access unit (AU), each AU contains a plurality of encoding units, and each encoding unit (EU) contains a group of pixels. One EU is a basic unit of pixel data encoding. The bit budget of each AU is a predetermined value, and the sum of bit budgets allocated to all EUs within each AU is required to be smaller than or equal to the predetermined bit budget of the AU, where the bit budget of one EU means the maximum encoded bit length of the EU. However, when one EU has complicated textures/contents included therein, a conventional compression algorithm may fail to make the encoded bit length of the EU satisfy a designated bit budget requirement of the EU. Hence, the proposed bit-plane scanning coding method can be employed to ensure that the encoded bit length of the EU is equal to or smaller than the designated bit budget of the EU. Further details directed to generating encoded pixel data of pixels within one EU based on the proposed bit-plane scanning coding method are described as follows.

Please refer to FIG. 1 again. The image encoding apparatus 102 has an input port 112 and an encoder 114. The input port 112 is arranged to receive a plurality of target pixels within one encoding unit EU of a frame from a preceding circuit element. It should be noted that the preceding circuit element may apply pixel processing to pixels in the frame before outputting the frame to the image encoding apparatus 102. The pixel data of each target pixel has at least one color channel data corresponding to at least one color channel. In a case where the frame is generated from the camera module 302 using a color filter array such as a Bayer color filter array, each pixel of the frame may include one color channel data corresponding to only one of a plurality of different color channels. In another case where the frame is generated from the application processor 202, each pixel of the frame may include a plurality of color channel data corresponding to a plurality of different color channels, respectively. By way of example, but not limitation, the color channels may correspond to an RGB format or a YUV (YCrCb) format. Besides, the input port 112 further receives a bit budget BB for pixels of an access unit AU to be encoded or for one image frame to be encoded.

The encoder 114 is a core part of the image encoding apparatus 102. The encoder 114 is coupled to the input port 112, and arranged to determine a bit budget $BB_{EU}$ for the encoding unit EU to be encoded, and perform bit-plane scanning coding upon selected pixels of the encoding unit EU according to the bit budget $BB_{EU}$ and a scanning order, and accordingly generate encoded pixel data of the selected pixels as encoded data of the target pixels within the encoding unit EU. The selected pixels are derived from the target pixels. In one exemplary design, all of the target pixels within the encoding unit EU are selected as the selected pixels to be encoded. In another exemplary design, only a portion of the target pixels within the encoding unit EU is selected as the selected pixels to be encoded. That is, not all of the pixel data of the encoding unit EU will undergo the proposed bit-plane scanning coding. The bit-plane scanning coding operation performed by the encoder 114 directly extracts partial bits of pixel data of each selected pixel as encoded pixel data of the selected pixel. Thus, the proposed bit-plane scanning coding may be regarded as a lossy compression operation due to the fact that a portion of the pixel data of each selected pixel is not considered during the coding procedure. For better understanding of technical features of the present invention, several scenarios of the bit-plane scanning coding operation are given as below.

Figure 6:
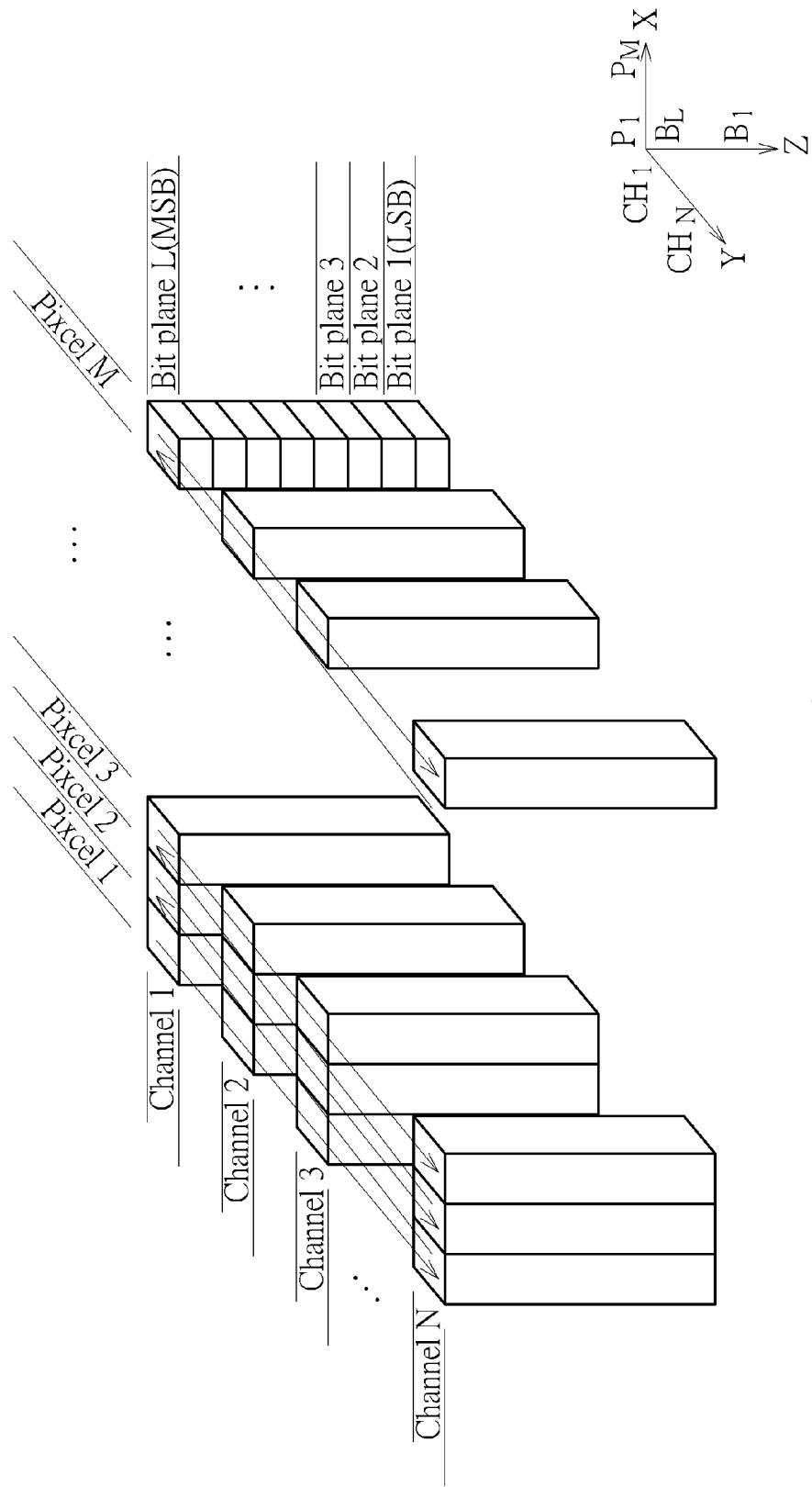
FIG. 6 is a diagram illustrating the bit-plane scanning coding applied to the selected pixels according to a first scenario.

In a first scenario, all of the target pixels within the encoding unit EU to be encoded are selected as the selected pixels, and no reordering is applied to the target pixels. Please refer to FIG. 6, which is a diagram illustrating the bit-plane scanning coding applied to the selected pixels according to the first scenario. The pixels in the EU can be one-dimension, two-dimension, or three-dimension. As shown in FIG. 6, different pixels are arranged in the X direction according to the predefined order of the EU, for example, raster scan order; different color channels are arranged in the Y direction; and different bit planes are arranged in the Z direction. In this embodiment, the encoding unit EU includes M pixels $P_1$-$P_M$ all directly selected as the selected pixels to undergo the following bit-plane scanning coding; each pixel has color channel data of N color channels $CH_1$-$CH_N$; and each color channel data corresponds to L bit planes to thereby have bits $B_1$-$B_L$ from the least significant bit (LSB) plane to the most significant bit (MSB) plane. Hence, the LSBs of color channel data of N color channels of all M pixels would form the $1^{st}$ bit plane, and the MSBs of color channel data of N color channels of all M pixels would form the $L^{th}$ bit plane. It should be noted that each pixel may include one color channel data of a single color channel or multiple color channel data of multiple color channels, depending upon the source of frames.

Based on the scanning order and the bit budge $BB_{EU}$ of the encoding unit EU, a bit budge for each selected pixel can be estimated by the encoder 114, and then partial bits of pixel data of each selected pixel are actually extracted as encoded pixel data of the selected pixel. The scanning order may be defined by at least one of following rules: in one color channel data of one color channel of one selected pixel, from a most significant bit plane (e.g., $B_L$) to a least significant bit plane (e.g., $B_1$); in one bit plane, from a first selected pixel (i.e., $P_1$) to a last selected pixel (e.g., $P_M$); and in one selected pixel, from a first color channel (e.g., $CH_1$) to a last color channel (e.g., $CH_N$). For clarity and simplicity, the following will assume that all of the above rules are employed to define the scanning order. It should be noted that the information of the scanning order employed by the encoder 114 should also be known by the decoder 124, such that the decoder 124 can perform the bit-plane scanning decoding to correctly recover the decoded pixel data of the target pixels within the encoding unit. Further details of enabling the decoder 124 to know the scanning order employed by the encoder 114 will be described later.

As the designated bit budget $BB_{EU}$ of the encoding unit EU is known, the bit-plane scanning coding is arranged to allocate a bit budget for each color channel data of each color channel of each selected pixel according the scanning order. More specifically, the first phase of the bit-plane scanning coding (i.e., a bit budget allocation process) adequately distributes the designated bit budget $BB_{EU}$ of the encoding unit EU to color channel data of color channels of all selected pixels based on the scanning order, and then the second phase of the bit-plane scanning coding (i.e., a bit extraction process) follows the bit budget allocation result to generate encoded pixel data of the selected pixels. In this way, the encoded pixel data (i.e., extracted bits) of the selected pixels would have an encoded bit length equal to or smaller than the designated bit budget $BB_{EU}$ of the encoding unit EU, thereby satisfying the compression requirement.

For example, bit budgets $BB\_CH_1$-$BB\_CH_N$ are calculated by the encoder 114 and allocated to color channels $CH_1$-$CH_N$, respectively. In a case where the bit budget $BB\_CH_i$ allocated to the $i^{th}$ color channel is divisible by the number M of selected pixels to be encoded, the number of more significant bits to be extracted from the color channel data of the $i^{th}$ color channel of each selected pixel (i.e., an allocated bit budget for the color channel data of the $i^{th}$ color channel of each selected pixel) may be uniformly set by $$\frac{BB\_CH_i}{M}.$$

Hence, successive bits from $B_L$ to $B_K$ would be extracted as encoded data, where $$K = L - \frac{BB\_CH_i}{M} + 1.$$

However, it is possible that the bit budget $BB\_CH_i$ allocated to the $i^{th}$ color channel (e.g., the last color channel $CH_N$) is not divisible by the number M of selected pixels to be encoded. Hence, the encoder 114 may not extract the same number of bits from each color channel data in the same color channel. By way of example, the bit budget $BB\_CH_i$ of the $i^{th}$ color channel may be regarded as a sum of partial bit budgets such as $BB\_CH_{i1}$ and $BB\_CH_{i2}$ ($BB\_CH_i$=$BB\_CH_{i1}$+$BB\_CH_{i2}$), where the bit budget $BB\_CH_{i1}$ is shared by selected pixels $P_1$-$P_{M-1}$, and the bit budget $BB\_CH_{i2}$ is allocated to the selected pixel $P_M$ only. Hence, the number of more significant bits to be extracted from the color channel data of the color channel $CH_i$ of each of selected pixels $P_1$-$P_{M-1}$ (i.e., an allocated bit budget for the color channel data of the $i^{th}$ color channel of each of selected pixels $P_1$-$P_{M-1}$) may be uniformly set by $$\frac{BB\_CH_{N1}}{M-1},$$

where $$\frac{BB\_CH_{i1}}{M-1} > BB\_CH_{i2}.$$

As can be clearly seen from FIG. 6, the color channel data of a specific color channel of the last selected pixel $P_M$ would have the lowest priority in the scanning order of the specific color channel. Thus, when an allocated bit budget for the specific color channel is not divisible by the number M of the selected pixels to be encoded, the encoding accuracy of at least the color channel data of the specific color channel (e.g., the last color channel $CH_N$) of the last selected pixel $P_M$ is sacrificed due to fewer bits extracted therefrom. If allocated bit budgets for the same specific color channel in successive encoding units are not divisible by the number M of the selected pixels to be encoded, the encoding accuracy degradation would occur at the same position regularly, thus resulting in visual artifacts which may be perceived by the viewer. To put it simply, when a bit budget allocated to one color channel is not divisible by the number of selected pixels to be encoded, the encoding accuracy degradation would occur due to non-uniform bit extraction. To improve the visual quality, the present invention therefore proposes reordering the target pixels within the encoding unit EU and/or reordering color channels within the encoding unit EU before the bit-plane scanning coding is performed. In this way, the occurrence position of the encoding accuracy degradation can be randomized, thereby mitigating the visual artifacts perceived by the viewer.

In a second scenario, all of the target pixels within the encoding unit EU to be encoded are selected as the selected pixels, and reordering is applied to the target pixels to set the selected pixels. More Specifically, a pixel reordering operation is performed upon at least one color channel to set the selected pixels that will undergo the bit-plane scanning coding. It should be noted that the information of the reordering relation of color channel data within each reordered color channel at the encoder 114 should also be known by the decoder 124, such that the decoder 124 can refer to the reordering strategy employed by the encoder 114 for performing the bit-plane scanning decoding to correctly recover the decoded pixel data of the target pixels within the encoding unit. Further details of enabling the decoder 124 to know the pixel reordering strategy employed by the encoder 114 will be described later.

Figure 7:
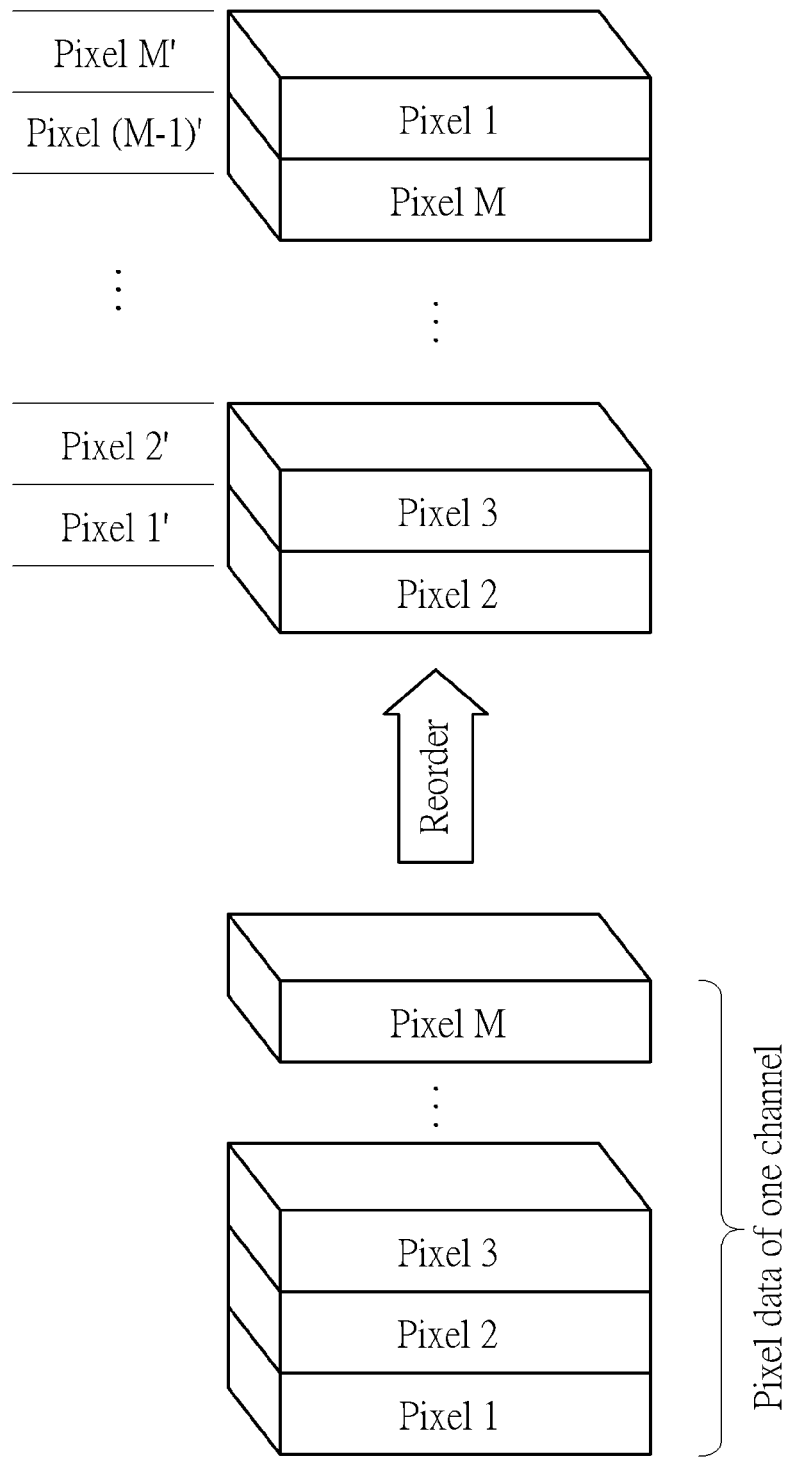
FIG. 7 is a diagram illustrating an exemplary pixel reordering operation performed by the encoder shown in FIG. 1.
Figure 8:
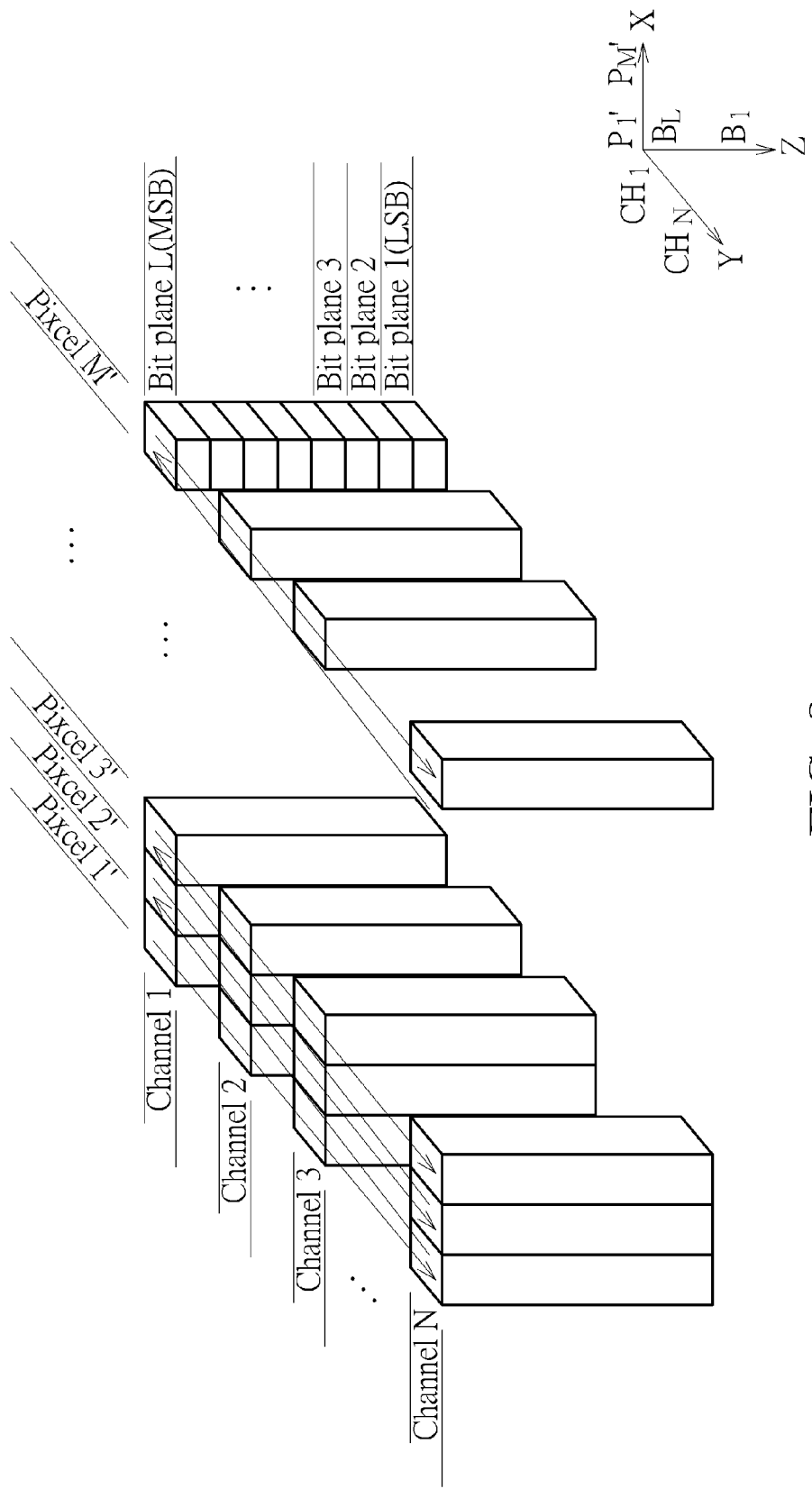
FIG. 8 is a diagram illustrating the bit-plane scanning coding applied to the selected pixels according to a second scenario.

Please refer to FIG. 7 in conjunction with FIG. 8. FIG. 7 is a diagram illustrating an exemplary pixel reordering operation performed by the encoder 114 shown in FIG. 1. FIG. 8 is a diagram illustrating the bit-plane scanning coding applied to the selected pixels according to the second scenario. As shown in FIG. 7, the color channel data of one color channel belong to target pixels $P_1$-$P_M$ of the encoding unit EU to be encoded, sequentially. After the pixel reordering operation is performed, color channel data of the color channel of target pixels $P_2$-$P_M$ and $P_1$ become color channel data of the same color channel of selected pixels $P_1'$-$P_M'$, sequentially. It should be noted that there is a one-to-one reordering/mapping relation between the target pixels $P_1$-$P_M$ and the selected pixels $P_1'$-$P_M'$. In other words, when pixel reordering is applied to one color channel, color channel data of one target pixel is mapped to one selected pixel only, and no color channel data of a different target pixel is mapped to the same selected pixel. For example, the encoding accuracy degradation happens to the color channel data of the target pixel $P_M$ before no pixel reordering operation is performed, and happens to the color channel data of the target pixel $P_1$ (i.e., the color channel data of the selected pixel $P_M'$) after the pixel reordering operation is performed. When different reordering/mapping relations are employed for the same color channel of different encoding units, the occurrence position of the encoding accuracy degradation would be dynamic rather than static. As shown in FIG. 8, the bit-plane scanning coding is performed after the bit budget allocation is determined for the selected pixels $P_1'$-$P_M'$ set by reordering the target pixels $P_1$-$P_M$ included in the encoding unit EU to be encoded. It should be noted that the operation of reordering the target pixels $P_1$-$P_M$ includes applying pixel reordering to at least one of the color channels $CH_1$-$CH_N$ of the target pixels $P_1$-$P_M$. Besides, when the operation of reordering the target pixels $P_1$-$P_M$ includes applying pixel reordering to different color channels of the target pixels $P_1$-$P_M$, different one-to-one reordering/mapping relations may be employed for different color channels. The major difference between the bit-plane coding scenario shown in FIG. 8 and the bit-plane coding scenario shown in FIG. 6 is that the selected pixels $P_1'$-$P_M'$ are not directly set by the successive target pixels $P_1$-$P_M$ originally arranged in the encoding unit EU to be encoded. Hence, based on the scanning order and the bit budge $BB_{EU}$ of the encoding unit EU, the bit-plane scanning coding extracts partial bits of pixel data of each selected pixel as encoded pixel data of the selected pixel. It should be noted that each pixel may include one color channel data of a single color channel or multiple color channel data of multiple color channels, depending upon the source of frames.

The same reordering concept may be applied to the color channels within the encoding unit EU to be encoded. In a third scenario, all of the target pixels within the encoding unit EU to be encoded are selected as the selected pixels, and reordering is applied to the color channels to set the selected pixels. More specifically, a color channel reordering operation is performed upon at least one pixel to set a selected pixel that will undergo the bit-plane scanning coding. It should be noted that the information of the reordering relation of color channel data within each reordered pixel at the encoder 114 should also be known by the decoder 124, such that the decoder 124 can perform the bit-plane scanning decoding to correctly recover the decoded pixel data of the target pixels within the encoding unit. Further details of enabling the decoder 124 to know the color channel reordering strategy employed by the encoder 114 will be described later.

Figure 9:
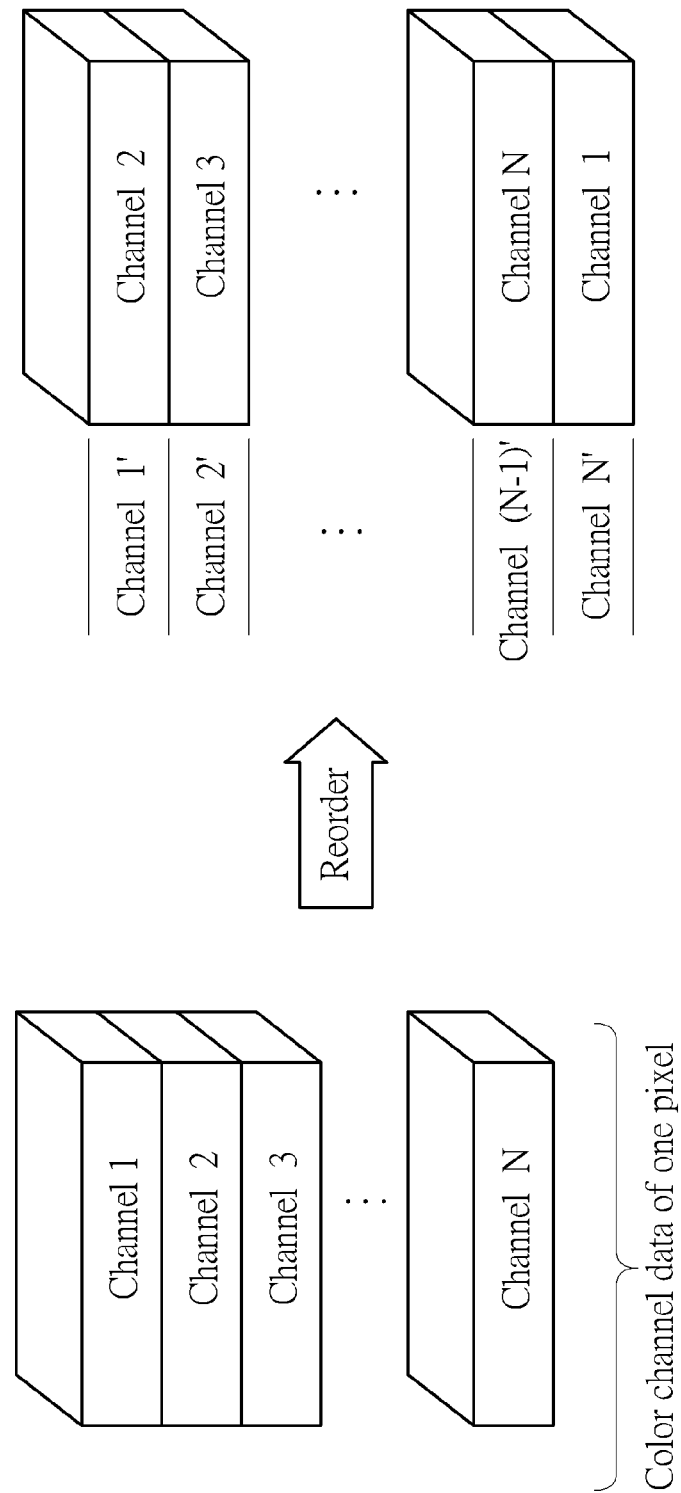
FIG. 9 is a diagram illustrating an exemplary color channel reordering operation performed by the encoder shown in FIG. 1.
Figure 10:
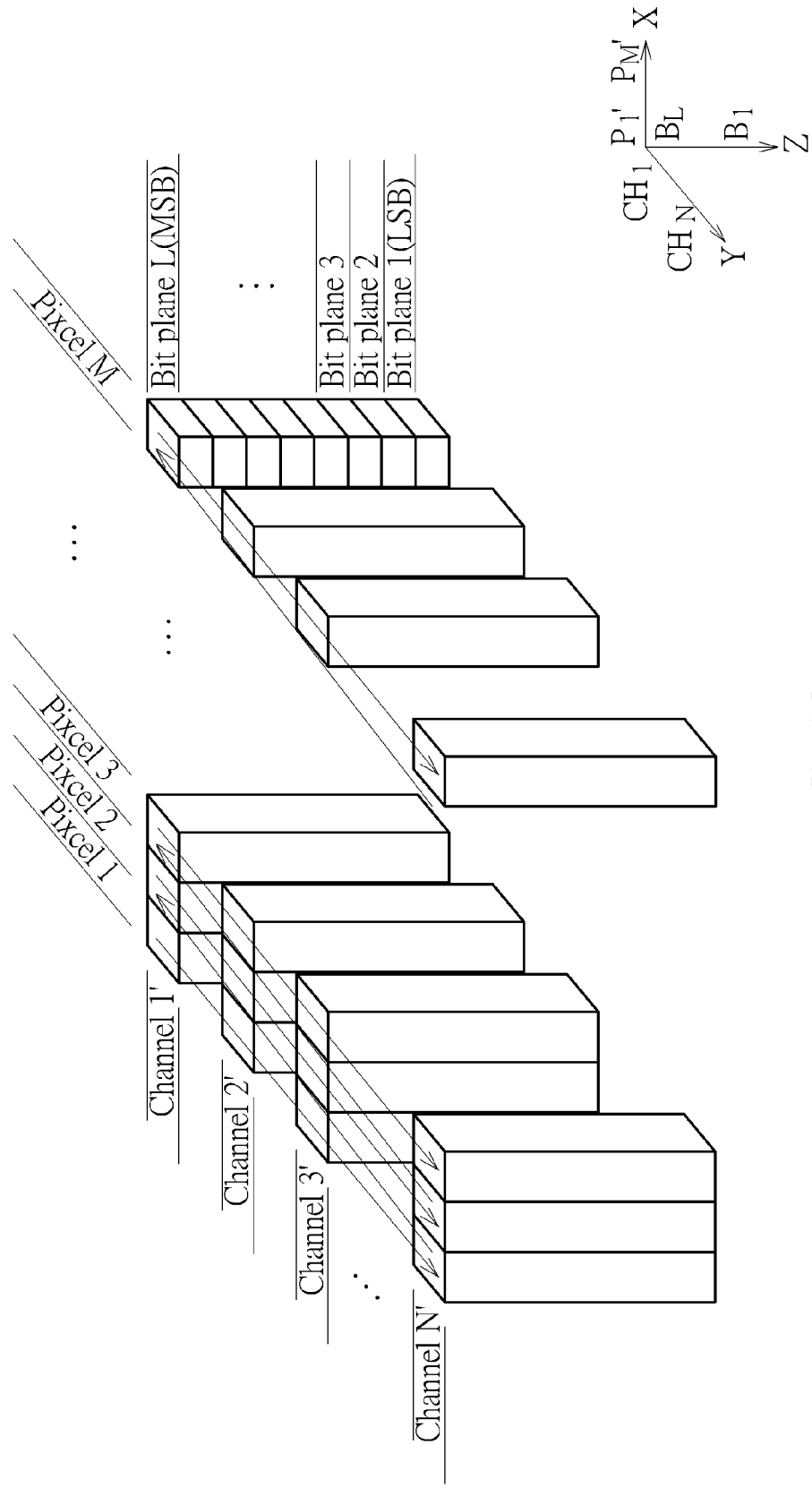
FIG. 10 is a diagram illustrating the bit-plane scanning coding applied to the selected pixels according to a third scenario.

Please refer to FIG. 9 in conjunction with FIG. 10. FIG. 9 is a diagram illustrating an exemplary color channel reordering operation performed by the encoder 114 shown in FIG. 1. FIG. 10 is a diagram illustrating the bit-plane scanning coding applied to the selected pixels according to the third scenario. As shown in FIG. 9, the color channel data of one pixel belong to different color channels $CH_1$-$CH_N$ of the encoding unit EU to be encoded, sequentially. After the color channel reordering operation is performed, color channel data of color channels $CH_2$-$CH_N$ and $CH_1$ of an original pixel become color channel data of color channels $CH_1'$-$CH_N'$ of a selected pixel, sequentially. It should be noted that there is a one-to-one reordering/mapping relation between the color channels $CH_1$-$CH_N$ and the reordered color channels $CH_1'$-$CH_N'$. For example, the encoding accuracy degradation happens to the color channel data of the color channel $CH_N$ before no color channel reordering operation is performed, and happens to the color channel data of the color channel $CH_1$ after the color channel reordering operation is performed. When different reordering/mapping relations are employed for the same pixel of different encoding units, the occurrence position of the encoding accuracy degradation would be dynamic rather than static. As shown in FIG. 10, the bit-plane scanning coding is performed after the bit budget allocation is determined for the selected pixels $P_1$-$P_M$ set by reordering the color channels $CH_1$-$CH_N$ within the encoding unit EU to be encoded. It should be noted that the operation of reordering the color channels $CH_1$-$CH_N$ includes applying color channel data reordering to at least one of the target pixels $P_1$-$P_M$. Besides, when the operation of reordering the color channels $CH_1$-$CH_N$ includes applying color channel data reordering to different target pixels $P_1$-$P_M$, different one-to-one reordering/mapping relations may be employed for different target pixels. Based on the scanning order and the bit budge $BB_{EU}$ of the encoding unit EU, the bit-plane scanning coding extracts partial bits of pixel data of each selected pixel with reordered color channel data as encoded pixel data of the selected pixel.

The pixel reordering shown in FIG. 7 and the color channel reordering shown in FIG. 9 may be employed by the encoder 114 individually or jointly. In an alternative design, a hybrid reordering operation, including pixel reordering and color channel reordering, may be used to set the selected pixels to undergo the following bit-plane scanning coding. This also belongs to the scope of the present invention. As a person skilled in the art should readily understand details of the hybrid reordering operation after reading above paragraphs directed to the pixel reordering (FIG. 7 and FIG. 8) and the color channel reordering (FIG. 9 and FIG. 10), further description is omitted here for brevity.

As mentioned above, the proposed bit-plane scanning coding extracts partial bits of pixel data of each selected pixel as encoded pixel data of the selected pixel. Hence, the encoding accuracy of each pixel depends on the number of bits actually extracted from the pixel. That is, when more bits are extracted from a pixel to serve as encoded data of the pixel, the encoding error introduced by the bit-plane scanning coding is smaller. Besides, adjacent pixels within the same encoding unit may have certain correlation. Thus, when the color channel data of a specific color channel of a specific pixel is intentionally discarded at the encoder side, the missing color channel data of the specific color channel of the specific pixel may be reconstructed at the decoder side through pixel data interpolation based on color channel data of the same specific color channel of adjacent pixels, or based on color channel data of the other color channel of adjacent pixels. Based on such an observation, the present invention further proposes discarding a portion of pixel data of the target pixels $P_1$-$P_M$ in the encoding unit EU to be encoded, thus allowing a larger bit budget to be allocated to at least one of the color channels (e.g., one color channel more critical to the visual quality) under the same designated bit budget $BB_{EU}$ of the encoding unit EU. By way of example, but not limitation, the information of the discarded/skipped color channel data at the encoder 114 should also be known by the decoder 124, such that the decoder 124 can recognize the location of the missing color channel data and perform interpolation to correctly recover the intentionally discarded/skipped color channel data. Further details of enabling the decoder 124 to know the discarding strategy employed by the encoder 114 will be described later.

Figure 11:
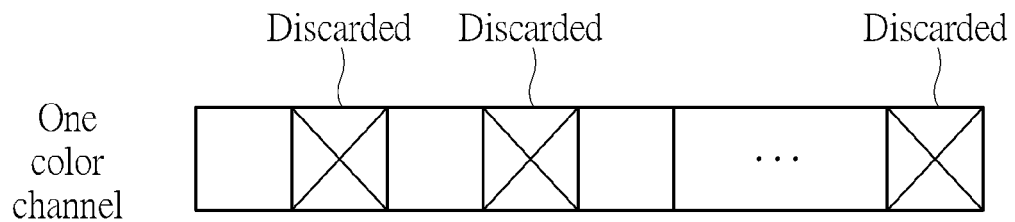
FIG. 11 is a diagram illustrating an exemplary channel pixel discarding/skipping operation performed by the encoder shown in FIG. 1.
Figure 11:
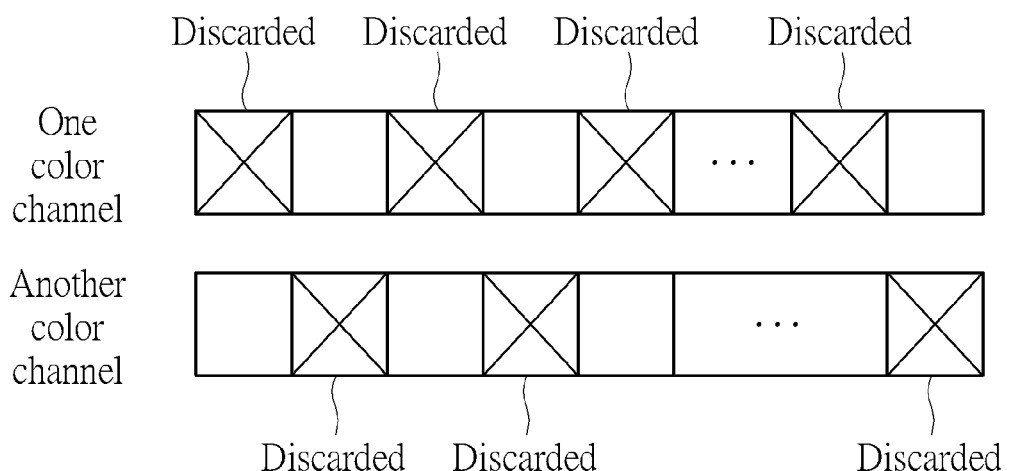
Figure 12:
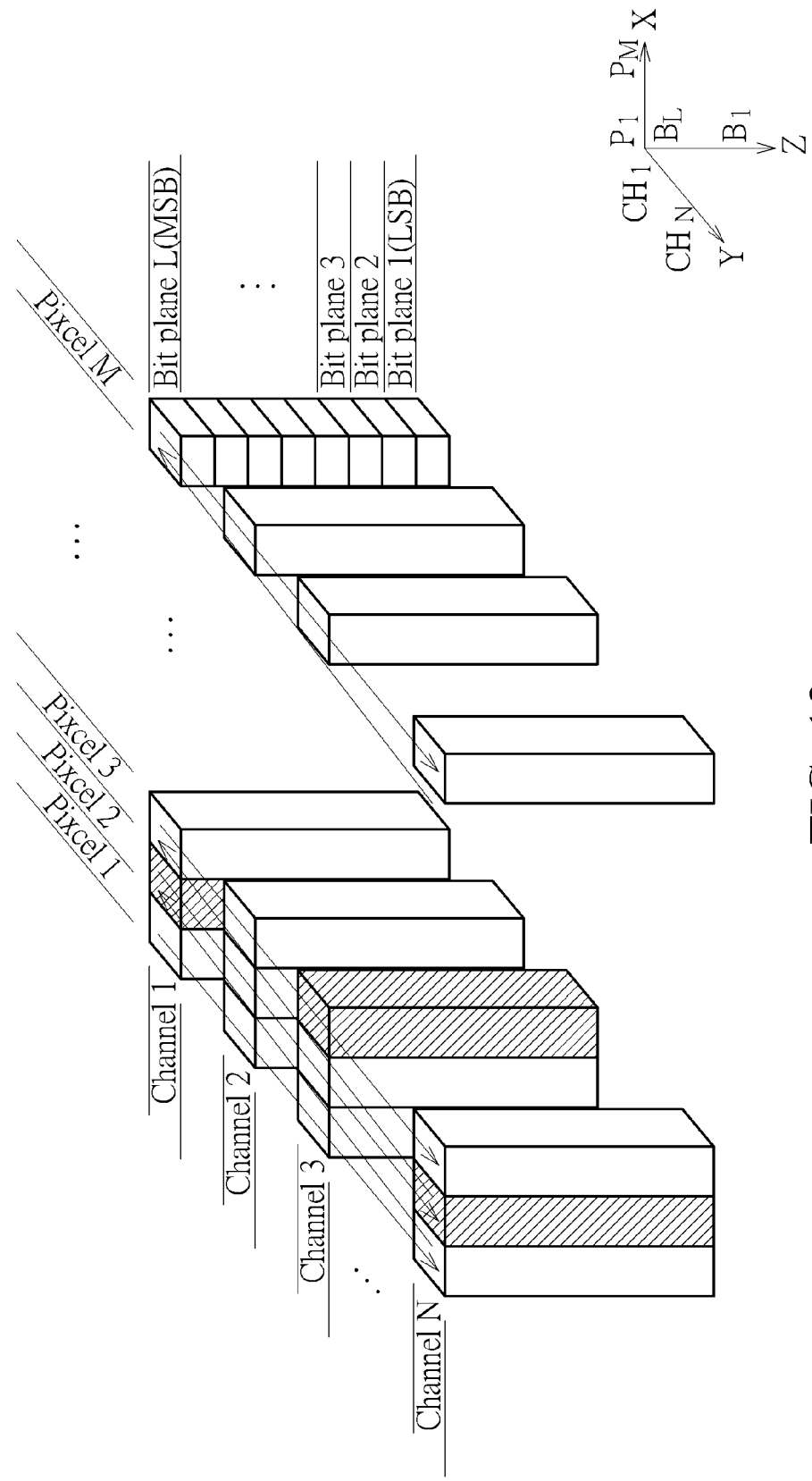
FIG. 12 is a diagram illustrating the bit-plane scanning coding applied to the selected pixels according to a fourth scenario.

In a fourth scenario, not all of the target pixels within the encoding unit EU to be encoded are selected as the selected pixels, and no reordering is applied to the target pixels and the color channels to set the selected pixels. Please refer to FIG. 11 in conjunction with FIG. 12. FIG. 11 is a diagram illustrating an exemplary channel pixel discarding/skipping operation performed by the encoder 114 shown in FIG. 1. FIG. 12 is a diagram illustrating the bit-plane scanning coding applied to the selected pixels according to the fourth scenario. In one exemplary design, the channel pixel discarding/skipping operation may employ a fixed sub-sampling pattern to determine which color channel data should be discarded/skipped. For example, as shown in sub-diagram (A) of FIG. 11, one-dimensional (1D) sub-sampling may be applied to one color channel so as to periodically discard/skip color channel data in the same color channel. Any target pixel with at least one color channel data not discarded/skipped is set as one of the selected pixels to be processed by the following bit-plane scanning coding. For another example, as shown in sub-diagram (B) of FIG. 11, two-dimensional (2D) sub-sampling may be applied to adjacent color channels so as to alternately discard/skip color channel data in the adjacent color channels. Any target pixel with at least one color channel data not discarded/skipped is set as one of the selected pixels to be processed by the following bit-plane scanning coding. It should be noted that the fixed sub-sampling patterns shown in FIG. 11 are for illustrative purposes only, and are not meant to be limitations of the present invention.

If the encoder 114 is configured to employ a determined sub-sampling rule for any encoding unit to determine which color channel data should be discarded/skipped, it is possible that there is no need to add information of the sub-sampling rule to a header which is transmitted from the image encoding apparatus 102 to the image decoding apparatus 104 due to the fact that the decoder 124 can also be configured to employ the same sub-sampling rule to determine which color channel data should be reconstructed by interpolation. That is, each of encoder 114 and decoder 124 may be initially configured to use the same sub-sampling rule regardless of the encoding units to be encoded. Hence, synchronization between sub-sampling processes performed by encoder 114 and decoder 124 is not needed.

Alternatively, the channel pixel discarding/skipping operation may employ a dynamic sub-sampling rule to determine which color channel data should be discarded/skipped. Hence, information of the dynamic sub-sampling pattern employed by the encoder 114 should be signaled to the image decoding apparatus 104, such that the decoder 124 can recognize the sub-sampling rule actually employed by the encoder 114 and correctly reconstruct the missing color channel data by interpolation. That is, each of encoder 114 and decoder 124 is allowed to dynamically adjust the sub-sampling rule when processing different encoding units. Hence, synchronization between sub-sampling processes performed by encoder 114 and decoder 124 is needed.

As shown in FIG. 12, the bit-plane scanning coding is performed after the selected pixels $P_1$-$P_M$ are set by applying channel pixel discarding/skipping to the target pixels $P_1$-$P_M$ included in the encoding unit EU to be encoded, where the areas marked by oblique lines represent the discarded/skipped color channel data not considered by the bit budget allocation and the bit extraction of the bit-plane scanning coding. The major difference between the bit-plane coding scenario shown in FIG. 12 and the bit-plane coding scenario shown in FIG. 6 is that the selected pixels $P_1$-$P_M$ are not directly set by the target pixels $P_1$-$P_M$ of the encoding unit EU to be encoded. Specifically, the data amount of the selected pixels $P_1$-$P_M$ to be actually processed by the bit-plane scanning coding is smaller than that of the target pixels $P_1$-$P_M$ originally included in the encoding unit EU to be encoded. Similarly, after the selected pixels $P_1$-$P_M$ are set after the channel pixel discarding/skipping, the bit-plane scanning coding refers to the scanning order and the bit budge $BB_{EU}$ of the encoding unit EU to properly extract partial bits of pixel data of each selected pixel as encoded pixel data of the selected pixel. It should be noted that each pixel may include one color channel data of a single color channel or multiple color channel data of multiple color channels, depending upon the source of frames.

In this example, the color channel data of the color channels $CH_1$ and $CH_N$ of the target pixel $P_2$ are discarded/skipped without being considered by the bit-plane scanning coding, and the color channel data of the color channels $CH_3$ of the target pixel $P_3$ is discarded/skipped without being considered by the bit-plane scanning coding. Hence, no partial bits of the color channel data of the color channels $CH_1$ and $CH_N$ of the target pixel $P_2$ and the color channel data of the color channels $CH_3$ will be extracted as encoded color channel data; and at least one of the color channels is allowed to be assigned with a larger bit budget for achieving better encoding accuracy. In a case where the color channels correspond to an RGB format, the green channel (G) is more important than the red channel (R) and the blue channel (B). Thus, the green channel (G) may be assigned with a larger bit budget under the condition where part of color channel data of the target pixels $P_1$-$P_M$ is not considered in the bit-plane scanning coding (i.e., the selected pixels $P_1$-$P_M$ finally set by the channel pixel discarding/skipping operation have a reduced amount of pixel data to be encoded). In other case where the color channels correspond to a YUV (YCrCb) format, the luminance channel (Y) is more important than the chrominance channels (U, V). Thus, the luminance channel (Y) may be assigned with a larger bit budget under the condition where part of color channel data of the target pixels $P_1$-$P_M$ is not considered in the bit-plane scanning coding (i.e., the selected pixels $P_1$-$P_M$ finally set by the channel pixel discarding/skipping operation have a reduced amount of pixel data to be encoded).

In this example shown in FIG. 12, not all of the color channels $CH_1$-$CH_N$ have the same number of pixels. More specifically, the number of selected pixels each having discarded color channel data corresponding to a first color channel is different from the number of selected pixels each having discarded color channel data corresponding to a second color channel different from the first color channel. However, this is for illustrative purposes only, and is not meant to be a limitation of the present invention.

In the aforementioned fourth scenario, the target pixels with at least one color channel data not discarded/skipped are directly set as the selected pixels to undergo the following bit-plane scanning coding for achieving better encoding quality of the selected pixels. In an alternative design, at least one of the aforementioned reordering operations, such as the pixel recording and the color channel reordering, may be introduced to mitigate the visual artifacts perceived by the viewer. Please refer to FIG. 13, which is a diagram illustrating the bit-plane scanning coding applied to the selected pixels according to a fifth scenario. In the fifth scenario, the reordering (e.g., a single reordering operation composed of either pixel reordering or color channel reordering; or a hybrid reordering composed of pixel reordering and color channel reordering) and the channel data discarding/skipping are both implemented to achieve better encoding quality and visual quality.

Figure 13:
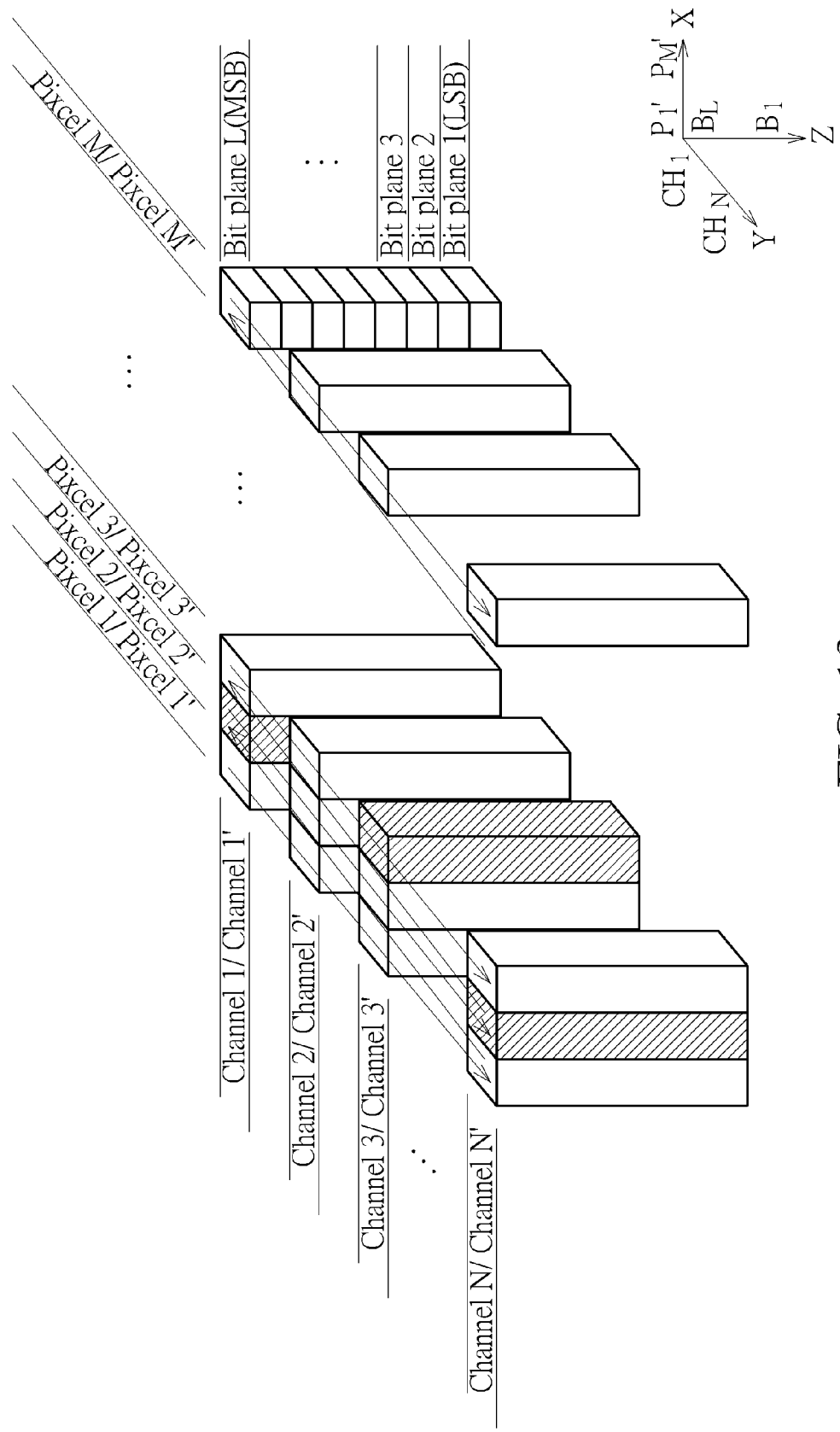
FIG. 13 is a diagram illustrating the bit-plane scanning coding applied to the selected pixels according to a fifth scenario.

In one exemplary design where the single reordering operation composed of the pixel reordering only is employed, the channel data reordering may be prior to the channel data discarding/skipping. Hence, the encoder 114 is arranged for reordering the target pixels $P_1$-$P_M$ to set the selected pixels $P_1'$-$P_M'$; and then discarding at least a portion of one color channel data corresponding to one color channel of at least one selected pixel before performing the bit-plane scanning coding, including bit budget allocation and bit extraction, upon the selected pixels. In another exemplary design where the single reordering operation composed of the pixel reordering only is employed, the channel data discarding/skipping may be performed prior to the channel data reordering. Hence, the encoder 114 is arranged for discarding at least a portion of one color channel data corresponding to one color channel of at least one target pixel. For example, the number of target pixels each having discarded color channel data corresponding to a first color channel may be different from the number of target pixels each having discarded color channel data corresponding to a second color channel different from the first color channel. Next, the encoder 114 is arranged for reordering target pixels obtained by the discarding step to set the selected pixels before performing the bit-plane scanning coding, including bit budget allocation and bit extraction, upon the selected pixels. The same objective of performing the bit-plane scanning coding upon the selected pixels as shown in FIG. 13 is achieved.

Similarly, when the reordering operation is set by the single reordering operation composed of the color channel reordering only or the hybrid reordering operation composed of the pixel recording and the color channel reordering, the reordering may be performed before the channel data discarding/skipping or after the channel data discarding/skipping, depending upon the design consideration. The same objective of performing the bit-plane scanning coding upon the selected pixels as shown in FIG. 13 is achieved.

As shown in FIG. 1, an output bit-stream BS_O is generated from the encoder 114 based on the encoded pixel data of the selected pixels which acts as encoded pixel data of the target pixels $P_1$-$P_M$. In this embodiment, the image decoding apparatus 104 includes an input port 122 and a decoder 124. The output bit-stream BS_O generated by the encoder 114 at the TX end (e.g., one chip) is transmitted to the decoder 124 at the RX end (e.g., another chip), and acts as an input bit-stream BS_I carrying encoded pixel data to be decoded. The input port 122 is arranged to receive the input bit-stream BS_I corresponding to a plurality of selected pixels, wherein the selected pixels are derived from the target pixels of one encoding unit EU of a frame. For example, the selected pixels to be decoded may be all of the target pixels, or the selected pixels to be decoded may be only a portion of the target pixels (i.e., a data amount of pixel data of selected pixels within an encoding unit of an encoded frame included in the input bit-stream BS_I is smaller than a data amount of pixel data of target pixels within the encoding unit of a frame to be decoded). Besides, the input port 122 may further receive a bit budget BB for pixels of an access unit AU to be decoded or for one image frame to be decoded. The decoder 124 is coupled to the input port 122, and arranged to determine the bit budget $BB_{EU}$ of the encoding unit EU, and further perform bit-plane scanning decoding upon the selected pixels according to the bit budget $BB_{EU}$ and the scanning order utilized by the encoder 114, and accordingly generate decoded pixel data of target pixels $P_1$-$P_M$ of an encoding unit EU' based on decoded pixel data of the selected pixels.

Based on the source of frames processed by the encoder side, the decoded pixel data of each target pixel has at least one color channel data corresponding to at least one color channel. For example, in a case where the frame processed by the encoder side is generated from the camera module 302 using a color filter array such as a Bayer color filter array, each pixel of the frame may include one color channel data corresponding to only one of a plurality of different color channels. Thus, the decoded pixel data of each target pixel has one color channel data corresponding to a single color channel only. In another case where the frame processed by the decoder side is generated from the application processor 202, each pixel of the frame may include a plurality of color channel data corresponding to a plurality of different color channels, respectively. Thus, the decoded pixel data of each target pixel has a plurality of color channel data corresponding to different color channels. By way of example, but not limitation, the color channels may correspond to an RGB format or a YUV (YCrCb) format.

The bit-plane scanning decoding performed by the decoder 124 at least fills partial bits of decoded pixel data of each selected pixel with encoded pixel data of the selected pixel. Specifically, the bit-plane scanning decoding at the decoder side may be regarded as an inverse process of the bit-plane scanning encoding at the encoder side. Thus, the encoding unit EU' at the decoder side is obtained based on how the original encoding unit EU is encoded at the encoder side.

As mentioned above, a bit budget $BB_{EU}$ of each encoding unit EU is controlled and configured by the encoder 114. To properly reconstruct the pixel data at the decoder side, information of the bit budget $BB_{EU}$ of each encoding unit EU should also be known by the decoder 124. One or more of the following proposed manners may be employed to enable the decoder 124 to determine the bit budget $BB_{EU}$ of each encoding unit EU.

When a first manner is adopted, the information of the bit budget $BB_{EU}$ of the encoding unit EU is transmitted from the encoder 114 to the decoder 124. For one example, the encoder 114 is configured to add the information of the bit budget $BB_{EU}$ of the encoding unit EU to the output bitstream BS_0, and the decoder 124 is configured to extract the information of the bit budget $BB_{EU}$ of the encoding unit EU from the input bitstream BS_I. For another example, an additional communication/handshaking/polling mechanism may be established between the encoder 114 and the decoder 124, such that the same bit budget $BB_{EU}$ of the encoding unit EU is used by each of the encoder 114 and the decoder 124.

When a second manner is adopted, the control mechanism used by the encoder 114 to set the bit budget $BB_{EU}$ of the encoding unit EU is also used by the decoder 124. In this way, the bit budget $BB_{EU}$ for the encoding unit EU to be encoded at the encoder side and the bit budget $BB_{EU}$ for the same encoding unit EU to be decoded at the decoder side are synchronized with each other due to the same control mechanism. For example, the bit budget BB for an access unit AU or an image frame to be encoded and bit budget (s) allocated to previous encoding unit(s) already processed by the encoder 114 may be referenced to determine the bit budget $BB_{EU}$ for the current encoding unit EU to be encoded by the encoder 114, and the bit budget BB for an access unit AU or an image frame to be decoded and bit budget(s) allocated to previous encoding unit(s) already processed by the decoder 124 may be referenced to determine the bit budget $BB_{EU}$ for the current encoding unit EU to be decoded by the decoder 124. Since the same control mechanism for setting the bit budget $BB_{EU}$ for the encoding unit EU is implemented in both of the encoder 114 and the decoder 124, the decoder 124 can obtain the bit budget $BB_{EU}$ for the encoding unit EU at the absence of the information of the bit budget $BB_{EU}$ for the encoding unit EU that is given from the encoder 114.

When a third manner is adopted, the encoder 114 and the decoder 124 are set by the same configuration to thereby use the same bit budget $BB_{EU}$ for an encoding unit EU. Similarly, the decoder 124 can obtain the bit budget $BB_{EU}$ for the encoding unit EU at the absence of the information of the bit budget $BB_{EU}$ for the encoding unit EU that is given from the encoder 114.

Further, to properly reconstruct the pixel data at the decoder side, the information of scanning order, reordering (if pixel reordering and/or color channel reordering are used to set the selected pixels to undergo the following bit-plane scanning coding) and discarding (if a portion of pixel data of target pixels in the encoding unit to be encoded is discarded to set the selected pixels to undergo the following bit-plane scanning coding) at the encoder 114 should also be known by the decoder 124. By way of example, one or more of the aforementioned manners may be employed to enable the decoder 124 to obtain scan order information, reordering strategy information and/or discarding strategy information as required.

Figure 14:
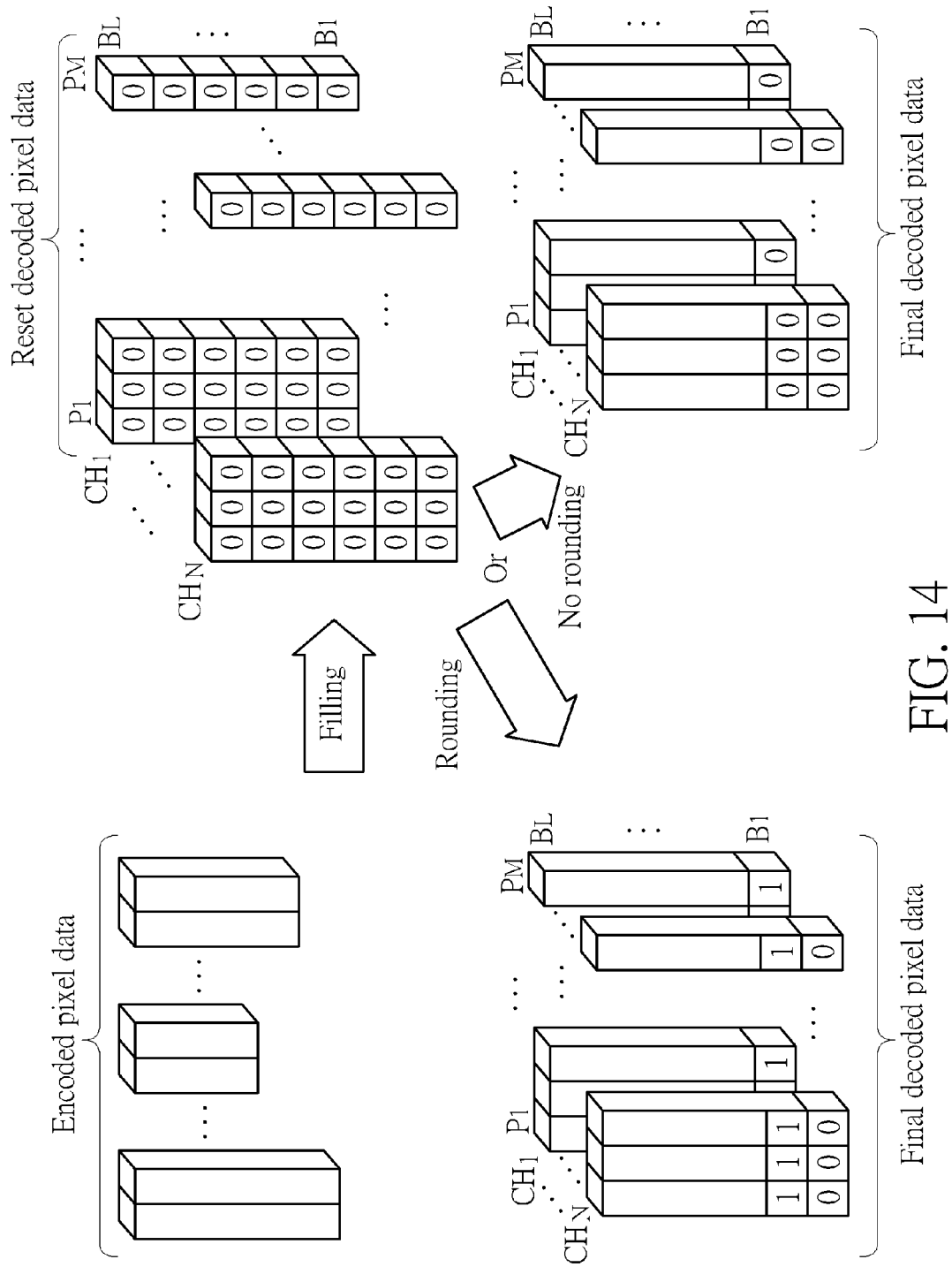
FIG. 14 is a diagram illustrating the bit-plane scanning decoding applied to the selected pixels according to a first scenario.

Please refer to FIG. 14, which is a diagram illustrating the bit-plane scanning decoding applied to the selected pixels according to a first scenario. In this example, the bit-plane scanning decoding shown in FIG. 14 is an inverse process of the bit-plane scanning coding shown in FIG. 6. Hence, the selected pixels to be decoded are all of the target pixels within the encoding unit EU' to be decoded. Initially, as illustrated in the top-right region of FIG. 14, the bit-plane scanning decoding resets all bits of decoded pixel data of all pixels (i.e., selected pixels which are all of the target pixels $P_1$-$P_M$) within the encoding unit EU' to be decoded to zero. In other words, bits of color channel data of each color channel of each pixel are reset by 0's. The reset decoded pixel data are composed of selected pixels being M pixels $P_1$-$P_M$; each pixel has color channel data of N color channels $CH_1$-$CH_N$; and each color channel data corresponds to L bit planes to thereby have bits $B_1$-$B_L$ from the LSB plane to the MSB plane.

Next, the bit-plane scanning decoding performs a filling operation to fill encoded color channel data of each color channel of each selected pixel into partial bits of decoded color channel data of each color channel of the selected pixel according to the scanning order and bit budge $BB_{EU}$ employed by the encoder 114. That is, partial bits of decoded color channel data of a selected pixel are overwritten by encoded color channel data of the selected pixel, and a remaining segment (i.e., less significant bits) of the decoded color channel data of the selected pixel would be filled with 0's. When performing the bit-plane scanning decoding, the decoder 124 also follows the same scanning order and the same bit budge for the encoding unit that are employed by the encoder 114 to perform a bit budget allocation process and a bit filling process in order. More specifically, based on the scanning order and the bit budge $BB_{EU}$, the bit-plane scanning decoding performed by the decoder 124 knows the number of bits belonging to the same color channel data of one color channel of one selected pixel and also knows the location from which these bits are extracted. That is, the bit-plane scanning decoding also allocates a bit budget for each color channel data of each color channel of each selected pixel according to the scanning order. In this way, the bit-plane scanning decoding performed by the decoder 124 can distinguish between encoded color channel data (i.e., extracted bits) of different selected pixels, and then stores the encoded color channel data (i.e., extracted bits) into correct bit locations to act as part of the decoded color channel data of the different selected pixels, where remaining bits of the different selected pixels that are not overwritten/filled by the corresponding encoded color channel data (i.e., extracted bits) are directly set by 0's.

As illustrated in the bottom-right region of FIG. 14, decoded pixel data of the target pixels $P_1$-$P_M$ can be obtained after the bit allocation process and the bit filling process in the bit-plane scanning decoding are done. In one exemplary design, the decoded pixel data of the target pixels $P_1$-$P_M$ may be directly output as the decoding result of the encoding unit EU'. Hence, the decoding result of the encoding unit EU' is composed of target pixels $P_1$-$P_M$ with partial bits set based on the encoded pixel data and partial bits directly filled with 0's; each pixel has color channel data of N color channels $CH_1$-$CH_N$; and each color channel data corresponds to L bit planes to thereby have bits $B_1$-$B_L$ from the LSB plane to the MSB plane.

In another exemplary design, additional pixel data processing may be performed at the decoder side to improve the accuracy of the decoding result of the encoding unit EU'. In a case where the bit-plane scanning coding at the encoder side directly extracts partial bits of pixel data of each selected pixel as encoded pixel data of the selected pixel (i.e., no rounding operation is performed at the encoder side), the bit-plane scanning coding is a lossy compression algorithm. In this embodiment, the decoder side directly sets any remaining bits of the selected pixel that is not overwritten/filled by the corresponding encoded color channel data (i.e., extracted bits) by 0's. To reduce the error between the original encoding unit EU at the encoder side and the encoding unit EU' reconstructed at the decoder side, the bit-plane scanning decoding may further perform a rounding operation upon each decoded color channel data of the selected pixels after the bit filling operation, thereby adjusting one of the remaining bit(s) of the selected pixel after filling partial bits of the decoded pixel data of the selected pixel with the encoded pixel data of the selected pixel. As shown in FIG. 14, regarding each color channel data, the first remaining bit adjacent to the last filled bit is changed to 1. Specifically, concerning one color channel data of one color channel of one pixel, when the last bit filled by the filling operation of the bit-plane scanning decoding is located at bit plane k ($1<k\leq L$), the rounding operation of the bit-plane scanning decoding changes a binary value of a bit located at bit plane (k−1) from '0' to '1'. In this example, the final decoded pixel data of target pixels of the encoding unit EU' is then generated after the rounding operation is accomplished. Hence, the decoding result of the encoding unit EU' is composed of target pixels $P_1$-$P_M$ with partial bits set based on the encoded pixel data, partial bits directly filled with 0's, and partial bits rounded to 1's; each pixel has color channel data of N color channels $CH_1$-$CH_N$; and each color channel data corresponds to L bit planes to thereby have bits $B_1$-$B_L$ from the LSB plane to the MSB plane.

Figure 15:
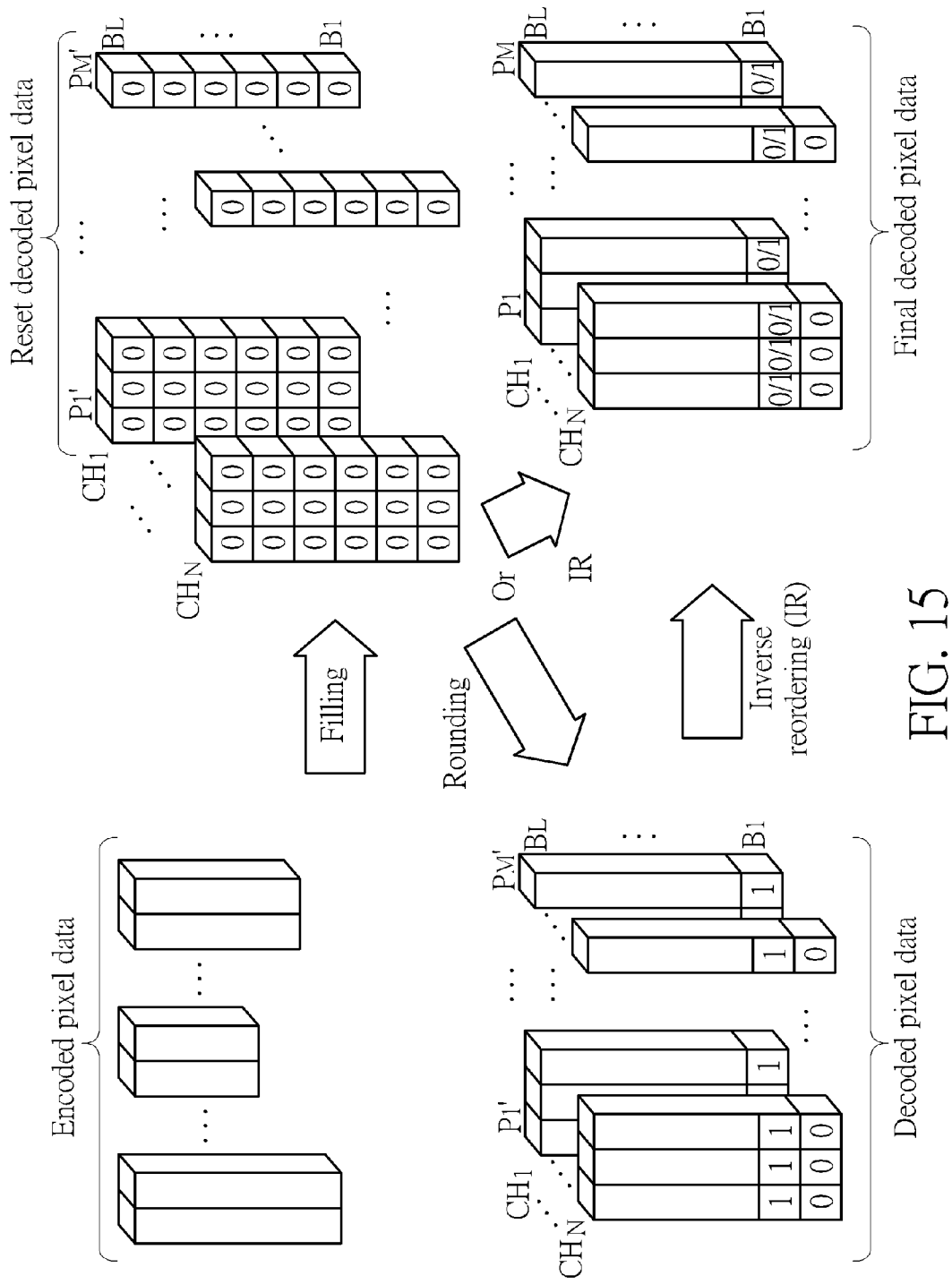
FIG. 15 is a diagram illustrating the bit-plane scanning decoding applied to the selected pixels according to a second scenario.

Please refer to FIG. 15, which is a diagram illustrating the bit-plane scanning decoding applied to the selected pixels according to a second scenario. In this example, the bit-plane scanning decoding shown in FIG. 15 is an inverse process of the bit-plane scanning coding shown in FIG. 8. Hence, the selected pixels to be decoded are all of the target pixels within the encoding unit EU' to be decoded. Initially, the bit-plane scanning decoding resets all bits of decoded pixel data of all reordered target pixels $P_1'$-$P_M'$ within the encoding unit EU' to zero. The reset decoded pixel data are composed of selected pixels being M reordered pixels $P_1'$-$P_M'$; each reordered pixel has color channel data of N color channels $CH_1$-$CH_N$; and each color channel data corresponds to L bit planes to thereby have bits $B_1$-$B_L$ from the LSB plane to the MSB plane.

In one exemplary design, after the filling operation of the bit-plane scanning decoding is accomplished, the selected pixels (i.e., the reordered target pixels) $P_1'$-$P_M'$ may be inversely reordered to set the target pixels $P_1$-$P_M$, wherein the operation of inversely reordering the selected pixels $P_1'$-$P_M'$ includes applying channel pixel inverse reordering (IR) to at least one of the color channels $CH_1$-$CH_N$ of the selected pixels (i.e., reordered pixels) $P_1'$-$P_M'$. Hence, the decoding result of the encoding unit EU' is composed of target pixels $P_1$-$P_M$ with partial bits set based on the encoded pixel data and partial bits directly filled with 0's; each pixel has color channel data of N color channels $CH_1$-$CH_N$; and each color channel data corresponds to L bit planes to thereby have bits $B_1$-$B_L$ from the LSB plane to the MSB plane.

In an alternative design, after the filling operation of the bit-plane scanning decoding is accomplished, the bit-plane scanning decoding performs the rounding operation upon selected pixels (i.e., the reordered target pixels) $P_1'$-$P_M'$ to reduce the error between the original encoding unit EU at the encoder side and the encoding unit EU' reconstructed at the decoder side, and then performs the reordering operation to generate decoded pixel data of the target pixels $P_1$-$P_M$. Hence, the decoding result of the encoding unit EU' is composed of target pixels $P_1$-$P_M$ with partial bits set based on the encoded pixel data, partial bits directly filled with 0's and partial bits rounded to 1's; each pixel has color channel data of N color channels $CH_1$-$CH_N$; and each color channel data corresponds to L bit planes to thereby have bits $B_1$-$B_L$ from the LSB plane to the MSB plane.

Figure 16:
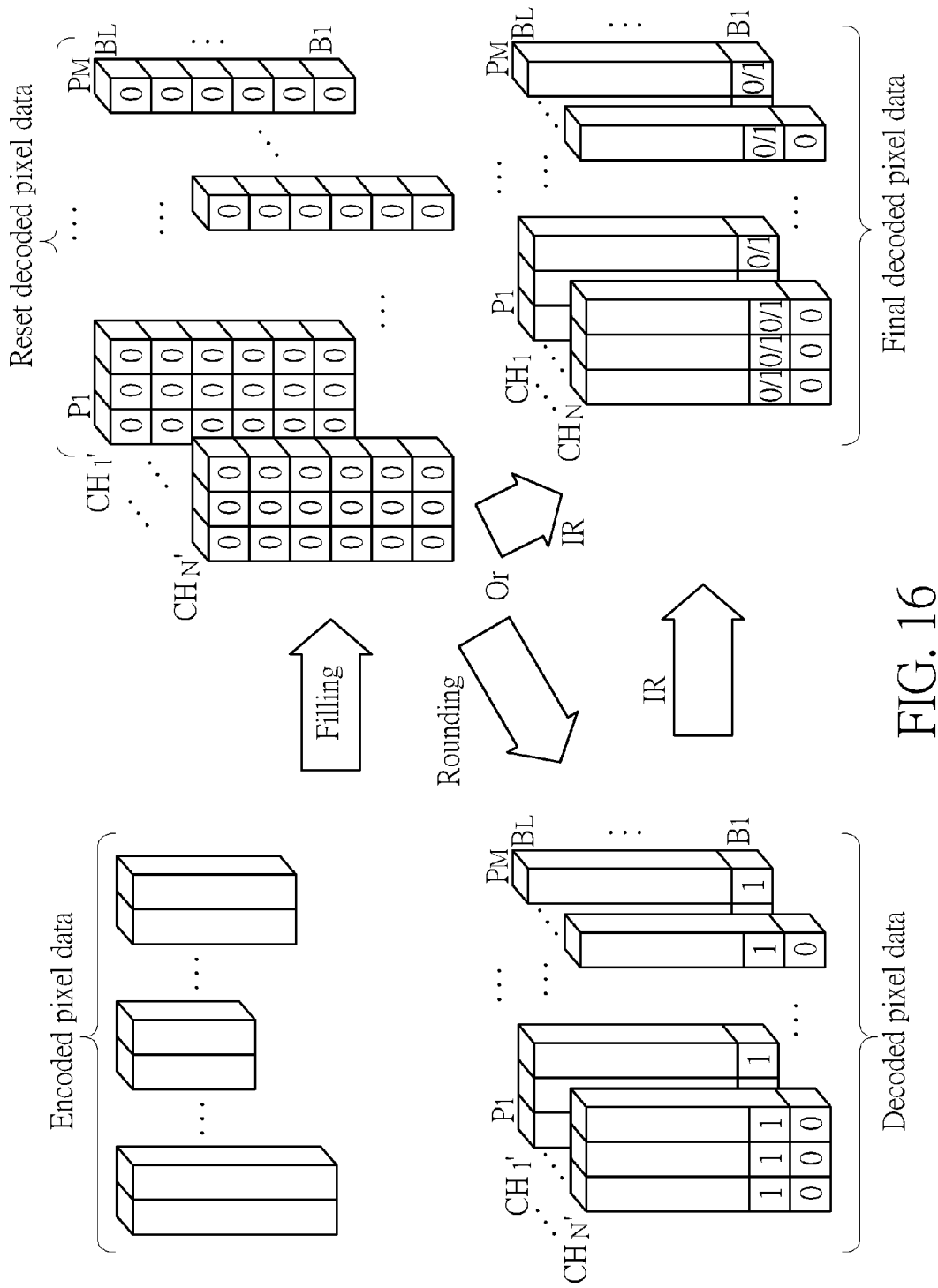
FIG. 16 is a diagram illustrating the bit-plane scanning decoding applied to the selected pixels according to a third scenario.

As mentioned above, the reordering operation at the encoder side may be a single reordering operation composed of either pixel reordering or color channel reordering, or may be a hybrid reordering composed of pixel reordering and color channel reordering. FIG. 15 shows an inverse process of the bit-plane scanning coding with pixel reordering. However, with a proper modification to the bit-plane scanning decoding operation shown in FIG. 15, an inverse process of the bit-plane scanning coding with color channel reordering, or an inverse process of the bit-plane scanning coding with pixel reordering and color channel reordering can be easily obtained. For example, please refer to FIG. 16, which is a diagram illustrating the bit-plane scanning decoding applied to the selected pixels according to a third scenario. In this example, the bit-plane scanning decoding shown in FIG. 16 is an inverse process of the bit-plane scanning coding shown in FIG. 10. As a person skilled in the art can readily understand details of the bit-plane scanning decoding shown in FIG. 16 after reading above paragraphs, further description is omitted here for brevity.

Figure 17:
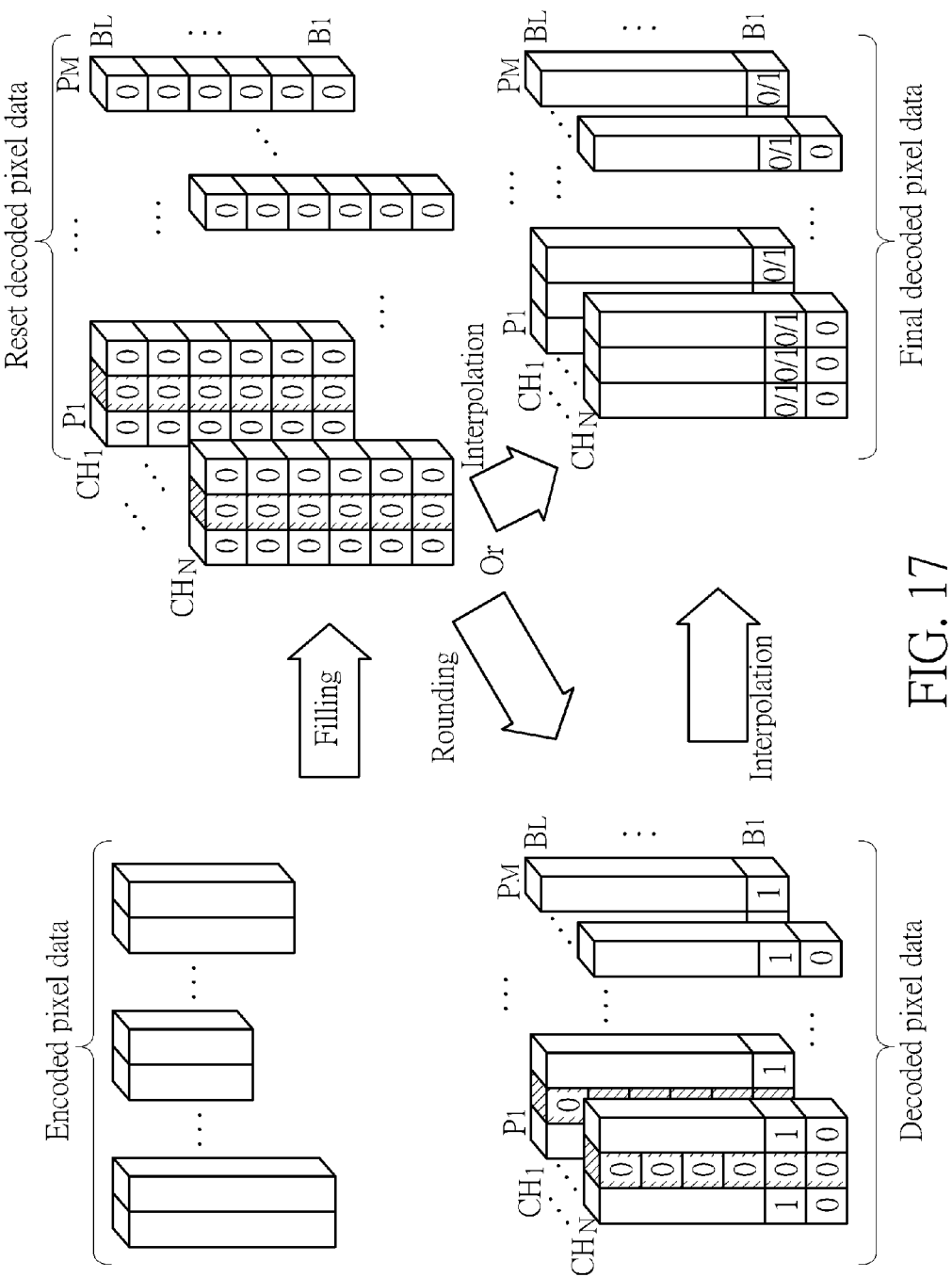
FIG. 17 is a diagram illustrating the bit-plane scanning decoding applied to the selected pixels according to a fourth scenario.

Please refer to FIG. 17, which is a diagram illustrating the bit-plane scanning decoding applied to the selected pixels according to a fourth scenario. In this example, the bit-plane scanning decoding shown in FIG. 17 is an inverse process of the bit-plane scanning coding shown in FIG. 12. Hence, the selected pixels to be decoded are only a portion of the target pixels within the encoding unit EU' to be decoded. Initially, the bit-plane scanning decoding resets all bits of decoded pixel data of all target pixels $P_1$-$P_M$ within the encoding unit EU' to zero. The reset decoded pixel data are composed of M pixels $P_1$-$P_M$ with a portion thereof being the selected pixels (i.e., pixels not marked by oblique lines) to be filled with the encoded pixel data; each pixel has color channel data of N color channels $CH_1$-$CH_N$; and each color channel data corresponds to L bit planes to thereby have bits $B_1$-$B_L$ from the LSB plane to the MSB plane.

After the filling operation of the bit-plane scanning decoding is accomplished, at least a portion of one color channel data corresponding to one color channel of at least one target pixel is missing due to the channel data discarding/skipping performed at the encoder side. In one exemplary design, the bit-plane scanning decoding performs interpolation based on adjacent color channel data of the same color channel or other color channel to recover at least the portion of the color channel data corresponding to the color channel of at least one target pixel. For example, the number of target pixels each having recovered color channel data corresponding to a first color channel may be different from the number of target pixels each having recovered color channel data corresponding to a second color channel different from the first color channel. Hence, the decoding result of the encoding unit EU' is composed of target pixels $P_1$-$P_M$ with partial bits set based on the encoded pixel data, partial bits directly filled with 0's and partial bits generated by interpolation; each pixel has color channel data of N color channels $CH_1$-$CH_N$; and each color channel data corresponds to L bit planes to thereby have bits $B_1$-$B_L$ from the LSB plane to the MSB plane.

In an alternative design, after the filling operation of the bit-plane scanning decoding is accomplished, the bit-plane scanning decoding performs the rounding operation upon selected pixels included in the target pixels $P_1$-$P_M$ to reduce the error between the original encoding unit EU at the encoder side and the encoding unit EU' reconstructed at the decoder side, and then performs the interpolation operation to generate decoded pixel data of the target pixels $P_1$-$P_M$. Hence, the decoding result of the encoding unit EU' is composed of target pixels $P_1$-$P_M$ with partial bits set based on the encoded pixel data, partial bits directly filled with 0's, partial bits rounded to 1's and partial bits generated by interpolation; each pixel has color channel data of N color channels $CH_1$-$CH_N$; and each color channel data corresponds to L bit planes to thereby have bits $B_1$-$B_L$ from the LSB plane to the MSB plane.

Figure 18:
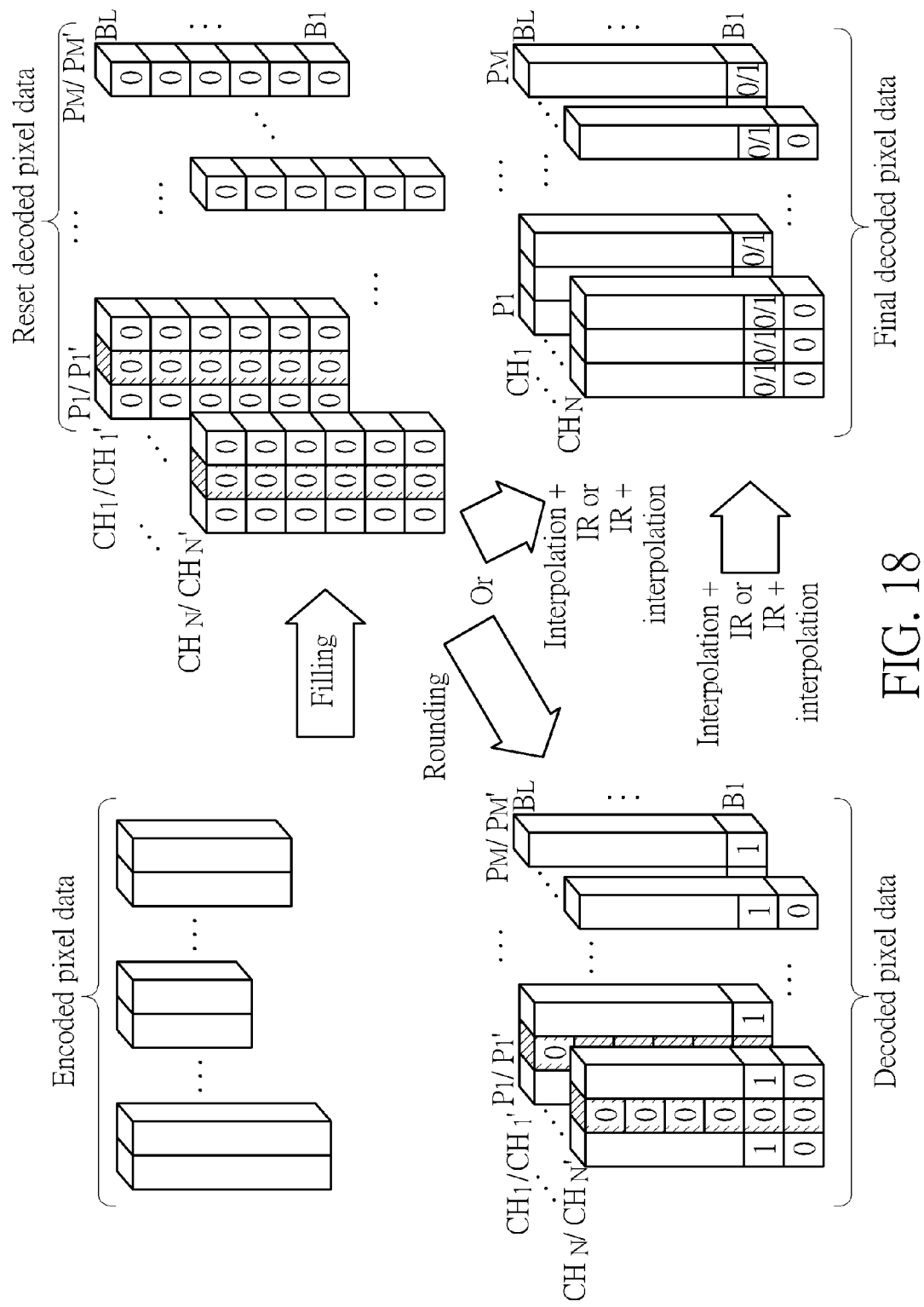
FIG. 18 is a diagram illustrating the bit-plane scanning decoding applied to the selected pixels according to a fifth scenario.

Please refer to FIG. 18, which is a diagram illustrating the bit-plane scanning decoding applied to the selected pixels according to a fifth scenario. In this example, the bit-plane scanning decoding shown in FIG. 18 is an inverse process of the bit-plane scanning coding shown in FIG. 13. Hence, the selected pixels to be decoded are only a portion of the target pixels within the encoding unit EU' to be decoded. Initially, the bit-plane scanning decoding resets all bits of decoded pixel data of all reordered target pixels $P_1'$-$P_M'$ and/or all reordered color channels $CH_1'$-$CH_N'$ within the encoding unit EU' to zero. Consider a case where the encoder side performs the reordering operation prior to the channel data discarding/skipping operation. Hence, after the filling operation of the bit-plane scanning decoding is accomplished, the interpolation operation and the inverse reordering operation may be performed sequentially to obtain decoded pixel data of the target pixels $P_1$-$P_M$. Consider another case where the encoder side performs the channel data discarding/skipping operation prior to the reordering operation. Hence, after the filling operation of the bit-plane scanning decoding is accomplished, the inverse reordering operation and the interpolation operation may be performed sequentially to obtain decoded pixel data of the target pixels $P_1$-$P_M$.

In an alternative design, after the filling operation of the bit-plane scanning decoding is accomplished, the bit-plane scanning decoding performs the rounding operation upon the selected pixels included in the reordered target pixels $P_1'$-$P_M'$ and/or the reordered color channels $CH_1'$-$CH_N'$ to reduce the error between the original encoding unit EU at the encoder side and the encoding unit EU' reconstructed at the decoder side, and then sequentially performs the inverse reordering operation and the interpolation operation (or the interpolation operation and the inverse reordering operation) to generate decoded pixel data of the target pixels $P_1$-$P_M$.

Preferably, the rounding operation is performed at the decoder side, such that no rounding operation is needed at the encoder side. However, this is not meant to be a limitation of the present invention. Alternatively, the rounding operation may be performed at the encoder side, such that no rounding operation is needed at the decoder side. In other words, additional pixel data processing may be performed at the encoder side to improve the accuracy of the encoding result of the encoding unit EU. Specifically, the bit-plane scanning coding at the encoder side performs a rounding operation after the bit allocation process and before the bit extraction process. For example, supposing that a bit budget (L−K+1) is allocated to bit-plane L to bit-plane K of one color channel data X of a specific pixel, the encoder-side rounding operation adds $2^{(K-2)}$ to X (i.e., one bit located at bit-plane K−2 of X is added by '1'), and selectively performs range clipping to avoid overflow of the adjusted color channel data X. In one exemplary embodiment, after the encoder-side rounding operation finishes processing each color channel data of each selected pixel within the encoding unit EU (the selected pixels may be all target pixels of the encoding unit EU with/without reordering applied thereto, or only a portion of the target pixels of the encoding unit EU with/without reordering applied thereto), the bit extraction process may be performed to extracting partial bits of pixel data of each selected pixel as encoded pixel data of the selected pixel. Since the rounding operation is done at the encoder side, no decoder-side rounding operation is needed.

It should be noted that the bit-plane scanning coding allocates a bit budget for each color channel data of each color channel of each selected pixel according to the scanning order. However, the bit-plane scanning coding is not required to encode these color channel data of color channels of selected pixels according to the scanning order. That is, the scanning order is referenced by the encoder 114 to decide how many bits should be extracted from each color channel data of each color channel of each selected pixel of the encoding unit EU to be encoded. After estimating the bit budget allocated for each color channel data of each color channel of each selected pixel, the encoder 114 may follow an encoding sequence to accomplish the actual bit extraction operation, where the encoding sequence may be identical to or different from the scanning order.

As mentioned above, the output bit-stream BS_O is generated from the encoder 114 based on the encoded pixel data of the selected pixels which acts as encoded pixel data of the target pixels $P_1$-$P_M$. Assume that each pixel has color channel of more than one color channel. When the encoder 114 follows an encoding sequence (which is identical to the scanning order) to accomplish the actual bit extraction operation, the encoder 114 at the TX end may generate the output bit-stream BS_O by directly outputting extracted bits of each color channel data as one encoded color channel data. As a result, the output bit-stream BS_O is composed of a plurality of bit-stream portions that are concatenated, where the bit-stream portions correspond to different color channels, and each of the bit-stream portions includes all of encoded color channel data of the same color channel in the encoding unit EU. The decoder 124 at the RX end decodes the received bit-stream (i.e., the input bit-stream BS_I) to reconstruct the pixel data of the encoding unit EU'. As the bit-stream portions of different color channels are concatenated, the bit-stream portions are decoded by the decoder 124 one by one. As a result, the bit-stream portion composed of encoded color channel data of one color channel has to be decoded after the bit-stream portion composed of encoded color channel data of another color channel has been decoded. The processing latency for obtaining decoded pixel data of one pixel is high, which results in degraded performance of the image decoding. Besides, the RX end requires a large data buffer to store all of the decoded color channel data obtained by decoding the encoded color channel data contained in the concatenated bit-stream portions, which increases the hardware cost inevitably. To create the output bit-stream BS_O with such a sequential bit-stream structure, the TX end also needs a large data buffer to store raw color channel data. Similarly, the buffer requirement and processing latency of the image encoding are high.

To solve these problems mentioned above, a packing process is employed by the encoder 114, and a corresponding unpacking process is employed by the decoder 124. When the encoder 114 follows an encoding sequence (which may be identical to or different from the scanning order) to accomplish the actual bit extraction operation, the encoder 114 at the TX end may generate the output bit-stream BS_O with an interleaved bit-stream structure by properly separating and/or packing encoded color channel data. Further details are described as below.

When the packing function is implemented, the encoder 114 is arranged for encoding the pixel data of the encoding unit EU into an interleaved output bit-stream BS_O composed of a plurality of color channel bit-stream segments that are concatenated, wherein each of the color channel bit-stream segments comprises color channel information of one color channel. In a first exemplary interleaving design, color channel bit-stream segments of the same color channel have variable lengths. The encoded pixel data of each selected pixel includes one extracted bit stream corresponding to each color channel of the selected pixel and serving as one color channel bit-stream segment, such that each of the color channel bit-stream segments comprises color channel information of one color channel. The encoder 114 performs the packing process by concatenating color channel bit-stream segments of the same selected pixel into one bit-stream portion; and concatenating bit-stream portions of different selected pixels into the output bit-stream BS_O.

Figure 19:
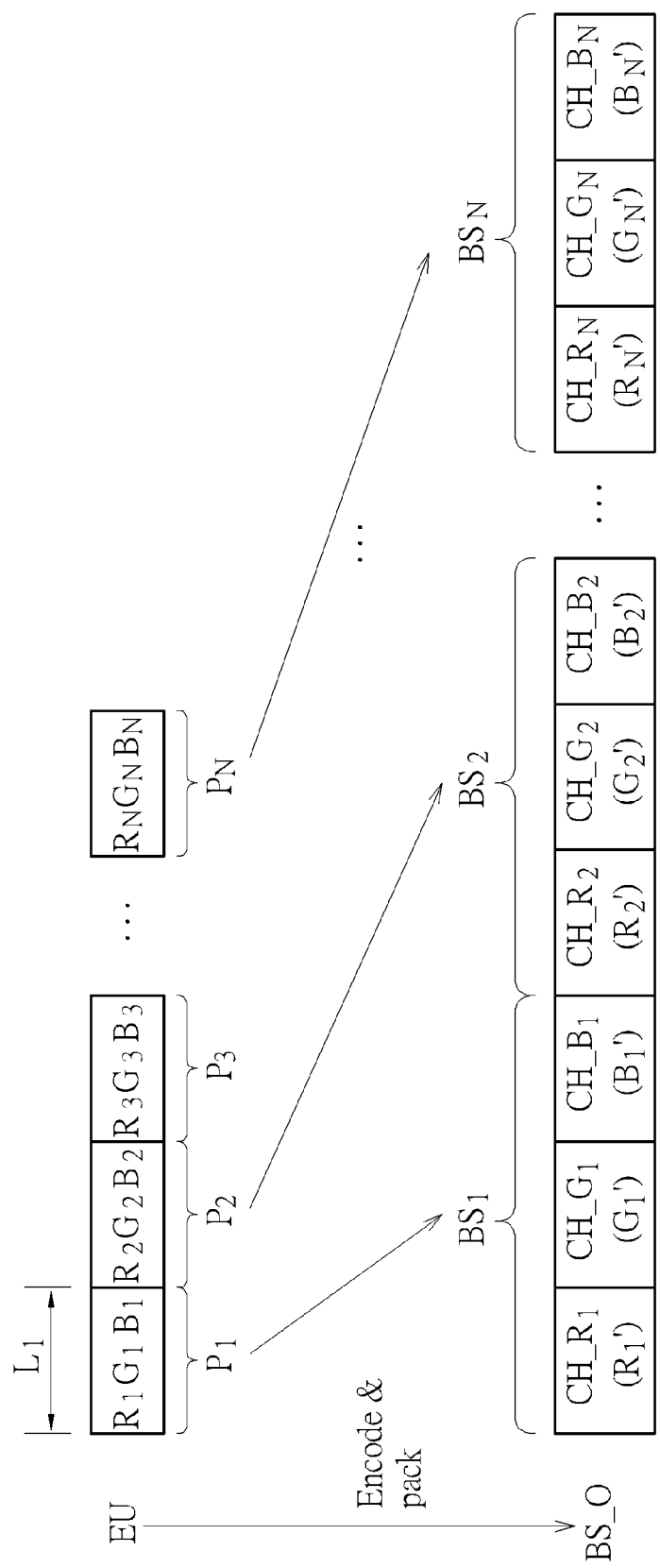
FIG. 19 is a diagram illustrating an image encoding and packing operation performed by the encoder shown in FIG. 1.

Please refer to FIG. 19, which is a diagram illustrating an image encoding and packing operation performed by the encoder 114 shown in FIG. 1. For clarity and simplicity, it is assumed that the color channels $CH_1$-$CH_N$ corresponds to an RGB format. The encoder 114 encodes the pixel data of the encoding unit EU into an interleaved output bit-stream BS_O. In this embodiment, the encoding unit EU may be regarded as having a plurality of pixel data parts $P_1$-$P_N$, each having the same data length $L_1$; and each of the pixel data parts $P_1$-$P_N$ includes different color channel data of a single pixel. That is, the pixel data part $P_1$ includes pixel data of the $1^{st}$ pixel in the encoding unit EU, the pixel data part $P_2$ includes pixel data of the $2^{nd}$ pixel in the encoding unit EU, and so on. As shown in FIG. 19, the encoder 114 encodes pixel data parts $P_1$-$P_N$ (i.e., pixel data of different pixels in the same encoding unit EU) into bit-stream portions $BS_1$-$BS_N$, where the bit-stream portions $BS_1$-$BS_N$ are concatenated, and each of the bit-stream portions $BS_1$-$BS_N$ is a set of color channel bit-stream segments of different color channels for the same pixel. Specifically, the bit-stream portion $BS_1$ has color channel bit-stream segments $CH\_R_1$, $CH\_G_1$, $CH\_B_1$; the bit-stream portion $BS_2$ has color channel bit-stream segments $CH\_R_2$, $CH\_G_2$, $CH\_B_2$; and the bit-stream portion $BS_N$ has color channel bit-stream segments $CH\_R_N$, $CH\_G_N$, $CH\_B_N$. The color channel bit-stream segments $CH\_R_1$, $CH\_G_1$, $CH\_B_1$ include encoded color channel data $R_1'$, $G_1'$, $B_1'$ (i.e., bit-streams derived from encoding color channel data $R_1'$, $G_1'$, $B_1$ based on the proposed bit-plane scanning coding), respectively; color channel bit-stream segments $CH\_R_2$, $CH\_G_2$, $CH\_B_2$ include encoded color channel data $R_2'$, $G_2'$, $B_2'$ (i.e., bit-streams derived from encoding color channel data $R_2$, $G_2$, $B_2$ based on the proposed bit-plane scanning coding), respectively; and color channel bit-stream segments $CH\_R_N$, $CH\_G_N$, $CH\_B_N$ include encoded color channel data $R_N'$, $G_N'$, $B_N'$ (i.e., bit-streams derived from encoding color channel data $R_N$, $G_N$, $B_N$ based on the proposed bit-plane scanning coding), respectively. In other words, bit-streams of the same color channel data included in pixel data of different pixels are packed into respective color channel bit-stream segments, and color channel bit-stream segments of different color channel data are concatenated into a final bit-stream (i.e., the interleaved output bit-stream BS_O).

Though the pixel data parts $P_1$-$P_N$ encoded by the encoder 114 have the same data length $L_1$, the bit-steam portions $BS_1$-$BS_N$ may not have the same data length due to the fact that the number of partial bits extracted from each color channel data is not necessarily fixed.

In above example shown in FIG. 19, each of the color channel bit-stream segments is generated by encoding fixed-length pixel data parts of the encoding unit EU. Thus, color channel bit-stream segments would have variant data lengths. In an alternative design, the color channel bit-stream segments in the final bit-stream is constrained to have fixed lengths. Preferably, each fixed length meets the decoding capability of the decoder 124. Hence, in a second exemplary interleaving design, color channel bit-stream segments of the same color channel have the same fixed length. The encoded pixel data of each selected pixel includes one extracted bit stream corresponding to each color channel of the selected pixel. The encoder 114 performs the packing process by packing extracted bit-streams of the same color channel of different selected pixels into a plurality of color channel bit-stream segments each having the same predetermined size (i.e., a fixed length); and concatenating color channel bit-stream segments of different color channels into the interleaved output bit-stream BS_O.

Figure 20:
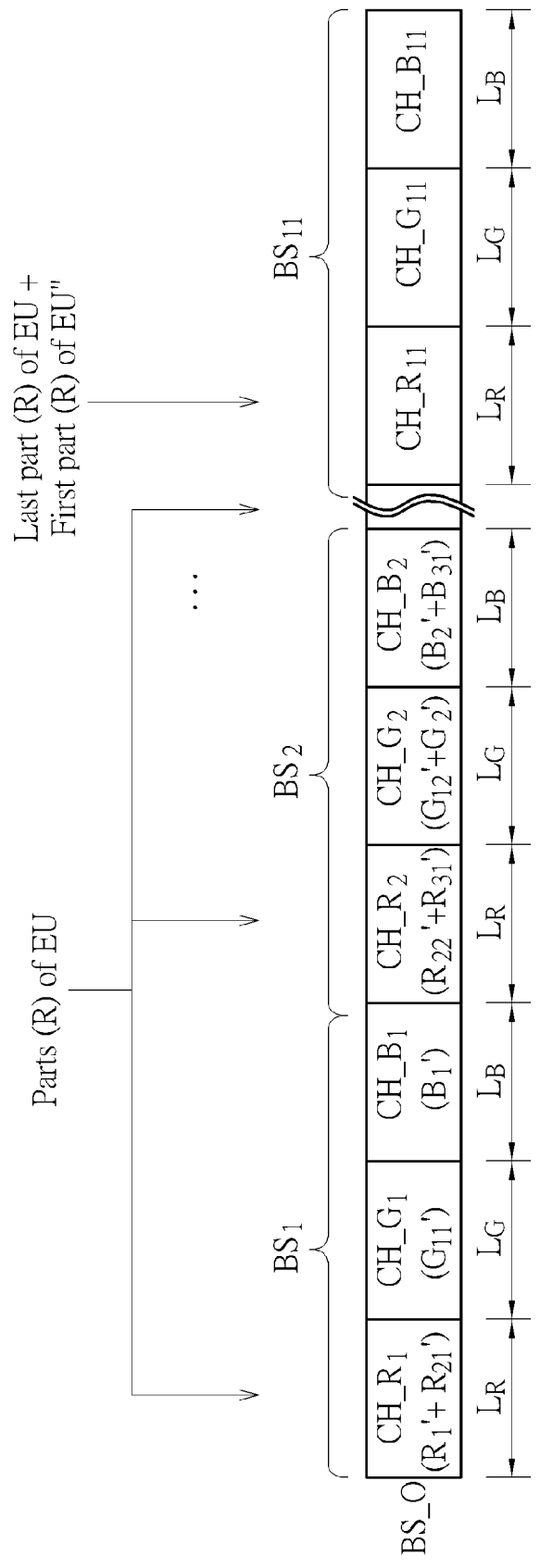
FIG. 20 is a diagram illustrating the interleaved bit-stream having fixed-length color channel bit-stream segments according to an embodiment of the present invention.

Please refer to FIG. 20, which is a diagram illustrating the interleaved bit-stream BS_I having fixed-length color channel bit-stream segments according to an embodiment of the present invention. In this embodiment, each color channel bit-stream segment for the red channel has a fixed length $L_R$, each color channel bit-stream segment for the green channel has a fixed length $L_G$, and each color channel bit-stream segment for the blue channel has a fixed length $L_B$. The fixed lengths $L_R$, $L_G$, $L_B$ may have the same value or different values, depending upon design consideration.

For example, each of the fixed lengths $L_R$, $L_G$, $L_B$ is 10 bits. Suppose that the encoded color channel data $R_1'$ generated by the bit-plane scanning coding has 6 bits, the encoded color channel data $R_2'$ generated by the bit-plane scanning coding has 8 bits, the encoded color channel data $R_3'$ generated by the bit-plane scanning coding has 12 bits, the encoded color channel data $G_1'$ generated by the bit-plane scanning coding has 15 bits, the encoded color channel data $G_2'$ generated by the bit-plane scanning coding has 5 bits, the encoded color channel data $B_1'$ generated by the bit-plane scanning coding has 10 bits, the encoded color channel data $B_2'$ generated by the bit-plane scanning coding has 7 bits, and the encoded color channel data $R_3'$ generated by the bit-plane scanning coding has 7 bits. Hence, the color channel bit-stream segment $CH\_R_1$ would be composed of the encoded color channel data $R_1'$ ($R_1'$=6 bits) and part of the encoded color channel data $R_2'$ ($R_{21}'$=4 bits); the color channel bit-stream segment $CH\_R_2$ would be composed of the remaining part of the encoded color channel data $R_2'$ ($R_{22}'$=4 bits) and part of the encoded color channel data $R_3'$ ($R_{31}'$=6 bits); the color channel bit-stream segment $CH\_G_1$ would be composed of part of the encoded color channel data $G_1'$ ($G_{11}'$=10 bits); the color channel bit-stream segment $CH\_G_2$ would be composed of the remaining part of the encoded color channel data $G_1'$ ($G_{12}'=5$ bits) and the encoded color channel data $G_2'$ ($G_2'=5$ bits); the color channel bit-stream segment $CH\_B_1$ would be composed of the encoded color channel data $B_1'$ ($B_1'=10$ bits); and the color channel bit-stream segment $CH\_B_2$ would be composed of the encoded color channel data $B_2'$ ($B_2'=7$ bits) and part of the encoded color channel data $B_3'$ ($B_{31}'=3$ bits).

Since each color channel bit-stream segment for the same specific color channel is required to have a fixed segment length and the size of encoded color channel data of the same specific color channel in an encoding unit may not be an integer multiple of the fixed segment length, at least one color channel bit-stream segment in the interleaved output bit-stream BS_O may include color channel information of the same specific color channel of different encoding units. Please refer to FIG. 20 again. Suppose that the color channel data $R_1$-$R_N$ of all pixels in the encoding unit EU are converted into encoded color channel data $R_1'$-$R_N'$, where the total amount of the encoded color channel data $R_1'$-$R_N'$ is 105 bits. Since the fixed length $L_R$ is 10 bits, ten color channel bit-stream segments $CH\_R_1$-$CH\_R_{10}$ are used to carry 100 bits of the encoded color channel data $R_1'$-$R_N'$, thus leaving 5 bits of the encoded color channel data $R_1'$-$R_N'$ in the next color channel bit-stream segment $CH\_R_{11}$. To make the color channel bit-stream segment $CH\_R_{11}$ filled with 10 bits, 5 bits of the encoded color channel data belonging to a different encoding unit EU" would be included in the color channel bit-stream segment $CH\_R_{11}$. In other words, the color channel bit-stream segment $CH\_R_{11}$ has color channel information of different encoding units.

The aforementioned image coding and packing operation shown in FIG. 19/FIG. 20 may be performed by an encoder implemented using pure hardware. Hence, to relax the buffer requirement, each set of color channel bit-stream segments (e.g., $BS_1$) is immediately generated and output by the encoder 114 at the time the required color channel bit-stream segments (e.g., $CH\_R_1$, $CH\_G_1$ and $CH\_B_1$) are obtained by encoding part of the pixel data of the encoding unit EU. By way of example, the encoder 114 may be configured to follow an encoding sequence different from the scanning order to thereby accomplish the actual bit extraction operation.

Alternatively, the aforementioned image coding and packing operation shown in FIG. 19/FIG. 20 may be performed by an encoder implemented using a processor executing software instructions. By way of example, the encoder 114 may be configured to follow an encoding sequence identical to the scanning order to thereby accomplish the actual bit extraction operation. As a result, the encoder 114 processes different color channels of the encoding unit one by one, such that all encoded color channel data of one color channel are generated and buffered. To obtain the interleaved output bit-stream BS_O shown in FIG. 19/FIG. 20, an additional bit-stream reordering process is performed by the encoder 114 to separate encoded pixel data into color channel bit-stream segments and pack the color channel bit-stream segments into the output bit-stream BS_O. The same objective of generating an output bit-stream with the proposed interleaved bit-stream structure is achieved.

Figure 21:
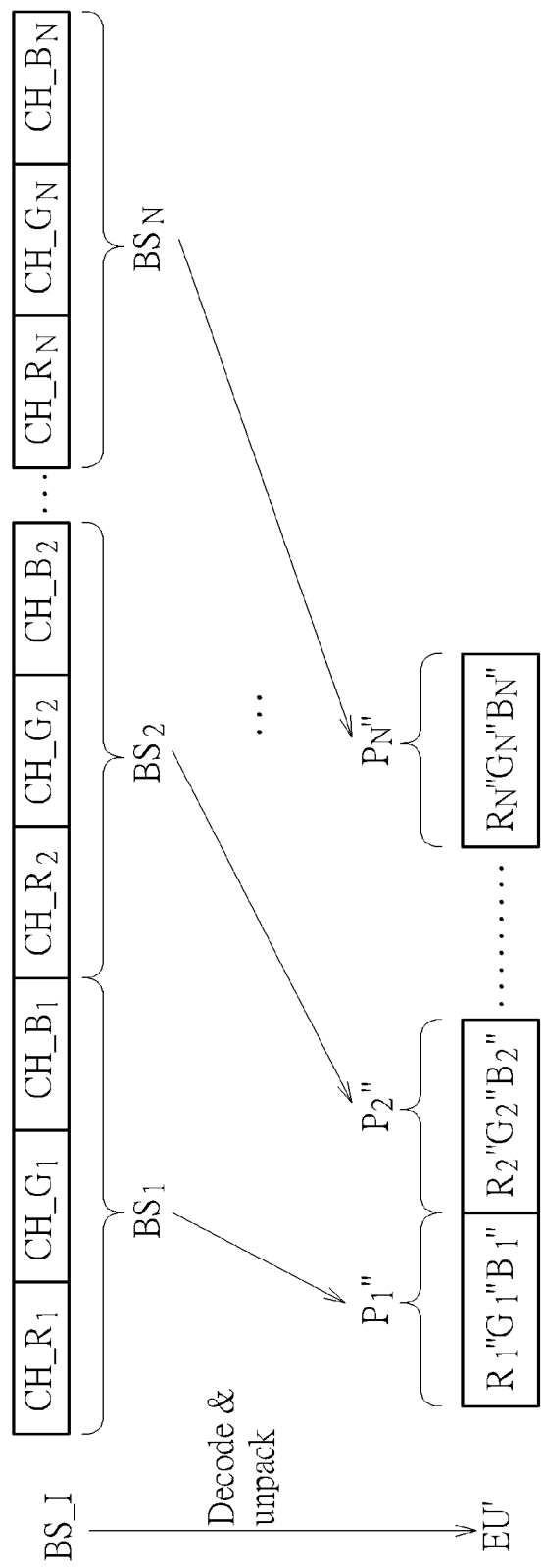
FIG. 21 is a diagram illustrating an image decoding and unpacking operation performed by the decoder shown in FIG. 1.

Based on the packing manner employed by the encoder 114, the decoder 124 is required to employ a corresponding unpacking manner. Please refer to FIG. 21, which is a diagram illustrating an image decoding and unpacking operation performed by the decoder 124 shown in FIG. 1. In this embodiment, the encoder 114 generates the interleaved output bit-stream BS_O shown in FIG. 19. As the bit-stream portions (i.e., sets of color channel bit-stream segments) $BS_1$-$BS_N$ are concatenated, the decoder 124 applies image decoding (i.e., the bit-plane scanning decoding) to the bit-stream segments $BS_1$-$BS_N$ one by one. Besides, as the color channel bit-stream segments are concatenated in each of the bit-streams $BS_1$-$BS_N$, the decoder 224 applies image decoding (i.e., the bit-plane scanning decoding) to the color channel bit-stream segments in the same bit-stream portion one by one. As shown in FIG. 19, each of the color channel bit-stream segments $CH\_R_1$-$CH\_R_N$, $CH\_G_1$-$CH\_G_N$, $CH\_B_1$-$CH\_B_N$ includes one encoded color channel data of a single pixel. Hence, the decoder 124 generates decoded color channel data $R_1''$, $G_1''$, $B_1''$, $R_2''$, $G_2''$, $B_2''$ ... $R_N''$, $G_N''$, $B_N''$ one by one, where the successive decoded color channel data $R_1''$, $G_1''$, $B_1''$ in the pixel data part $P_1''$ generated from decoding the color channel bit-stream segments $CH\_R_1$, $CH\_G_1$ and $CH\_B_1$ included in the bit-stream $BS_1$ are decoded pixel data of the $1^{st}$ pixel in the encoding unit EU', the successive decoded color channel data $R_2''$, $G_2''$, $B_2''$ in the pixel data part $P_2''$ generated from decoding the color channel bit-stream segments $CH\_R_2$, $CH\_G_2$ and $CH\_B_2$ included in the bit-stream $BS_2$ are decoded pixel data of the $2^{nd}$ pixel in the encoding unit EU', and the successive decoded color channel data $R_N''$, $G_N''$, $B_N''$ in the pixel data part $P_N''$ generated from decoding the color channel bit-stream segments $CH\_R_N$, $CH\_G_N$ and $CH\_B_N$ included in the bit-stream $BS_N$ are decoded pixel data of the $N^{th}$ pixel in the encoding unit EU'. No data buffer is needed for buffering decoded color channel data for two color channels (e.g., red channel and green channel) since decoded pixel data of pixels are generated from the decoder 124 sequentially. Compared to the conventional decoding design which requires a large-sized data buffer for buffering decoded color channel data, the proposed decoding design has relaxed data buffer requirement and lower hardware cost. Besides, compared to the conventional decoding design, the proposed decoding design has lower processing latency for obtaining decoded pixel data of one pixel since the buffer overhead is reduced. It is self-explanatory that the proposed encoding design used for generating the interleaved output bit-stream BS_O would also have lower data buffer requirement and processing latency.

As mentioned above, each of the color channel bit-stream segment may be generated by encoding color channel data of more than one pixel due to the requirement of using a fixed segment length. Similarly, when receiving the input bit-stream BS_I with the interleaved bit-stream structure shown in FIG. 20, the decoder 124 decodes the bit-stream portions (i.e., sets of color channel bit-stream segments) in the interleaved input bit-stream BS_I one by one, and decodes color channel bit-stream segments in each bit-stream portion one by one. To obtain pixel data of one pixel in the encoding unit EU', a small-sized data buffer may be needed by the decoder 124 for temporarily storing decoded color channel data because one fixed-length color channel bit-stream segment for one color channel may include encoded color channel data of more than one pixel. Taking the decoding of the interleaved input bit-stream BS_I for example, the decoder 124 generates decoded color channel data for $R_1'$, $R_{21}'$, $G_{11}'$, $B_1'$, $R_{22}'$, $R_{31}'$, $G_{12}'$, $G_2'$, $B_2'$, $B_{31}'$, etc. one by one. Therefore, the decoded color channel data derived from sequentially decoding $R_1'$, $R_{21}'$, $G_{11}'$, $B_1'$, $R_{22}'$, $R_{31}'$ are buffered. When the decoded color channel data of $G_{12}'$ is obtained, the pixel data of the $1^{st}$ pixel in the encoding unit EU' is output, where the decoded color channel data for $R_1'$, $G_{11}'$, $B_1'$ are read from the data buffer. Similarly, the decoded color channel data derived from decoding $G_2'$ is also buffered. When the decoded color channel data of $G_2'$ is obtained, the pixel data of the $2^{nd}$ pixel in the encoding unit EU' is output, where the decoded color channel data for $R_{21}'$, $R_{22}'$, $G_2'$ are read from the buffer. The following decoding and unpacking operation can be deduced by analogy. As a person skilled in the art can readily understand details of the image decoding operation applied to the interleaved input bit-stream BS_I with the interleaved bit-stream structure shown in FIG. 20 after reading above paragraphs directed to the image decoding operation shown in FIG. 21, further description is omitted here for brevity.

Figure 22:
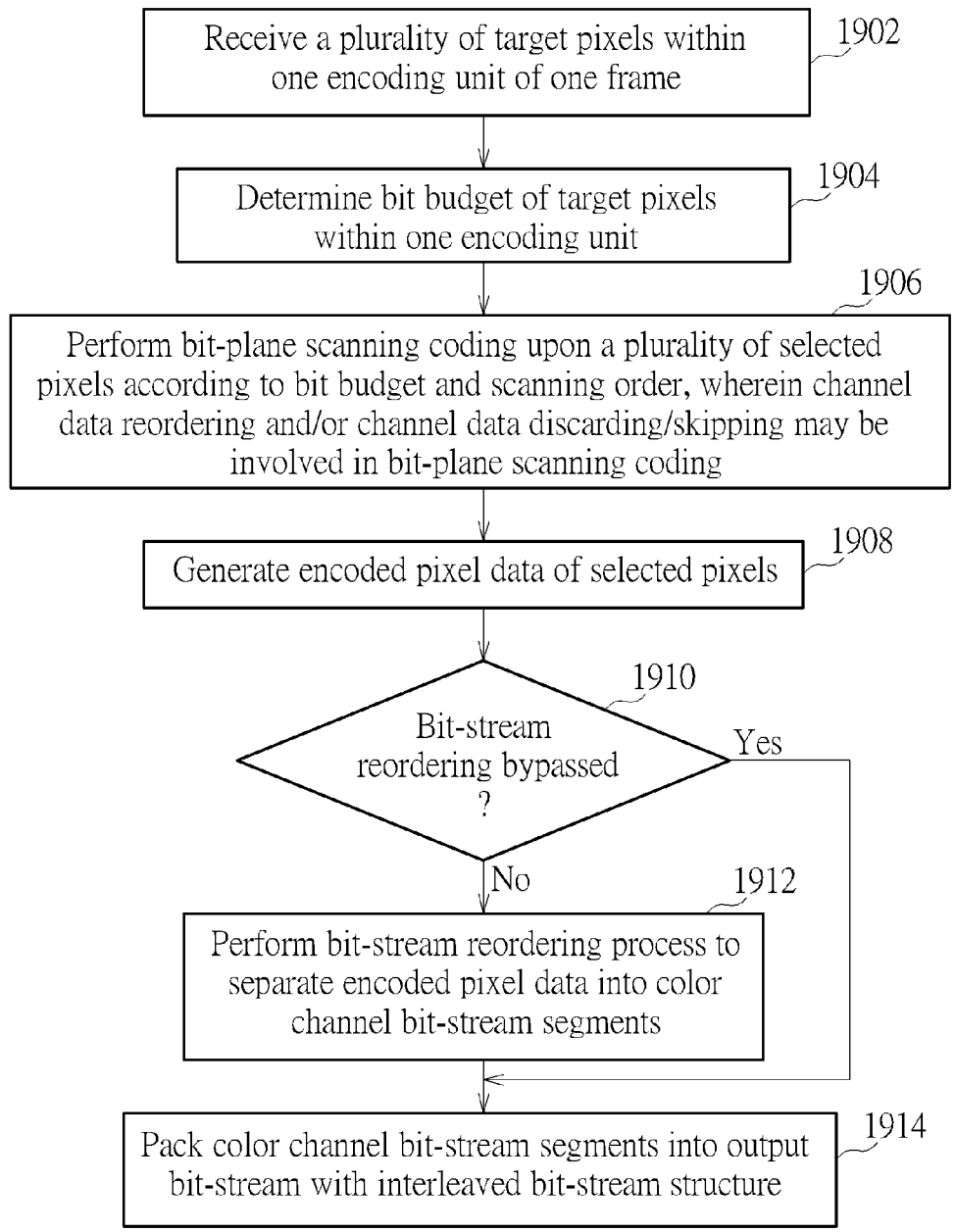
FIG. 22 is a flowchart illustrating an image encoding method according to an embodiment of the present invention.

FIG. 22 is a flowchart illustrating an image encoding method according to an embodiment of the present invention. Provided that the result is substantially the same, the steps are not required to be executed in the exact order shown in FIG. 22. The image encoding method may be employed by the image encoding apparatus 102 shown in FIG. 1, and can be briefly summarized as follows.

Step 1902: Receive a plurality of target pixels within one encoding unit of a frame.

Step 1904: Determine a bit budget (e.g., $BB_{EU}$) of the target pixels within one encoding unit.

Step 1906: Perform bit-plane scanning coding upon selected pixels according to the bit budget and a scanning order, wherein all of the target pixels are selected as the selected pixels to be encoded, or only a portion of the target pixels is selected as the selected pixels. Besides, reordering (e.g., pixel reordering and/or color channel reordering) and/or channel data discarding/skipping may be performed during the bit-plane scanning coding.

Step 1908: Generate encoded pixel data of the selected pixels, wherein the bit-plane scanning coding extracts partial bits of pixel data of each selected pixel as encoded pixel data of the selected pixel.

Step 1910: Check if a bit-stream reordering process should be bypassed. If yes, go to step 1914; otherwise, go to step 1912.

Step 1912: Perform the bit-stream reordering process to separate encoded pixel data into color channel bit-stream segments.

Step 1914: Pack the color channel bit-stream segments into an output bit-stream with an interleaved bit-stream structure.

As a skilled person can readily understand details of each step shown in FIG. 22 after reading above paragraphs directed to the image encoding apparatus 102, further description is omitted here for brevity. It should be noted that an encoder-side rounding operation may be performed to improve the encoding accuracy, where no decoder-side rounding operation is required.

Figure 23:
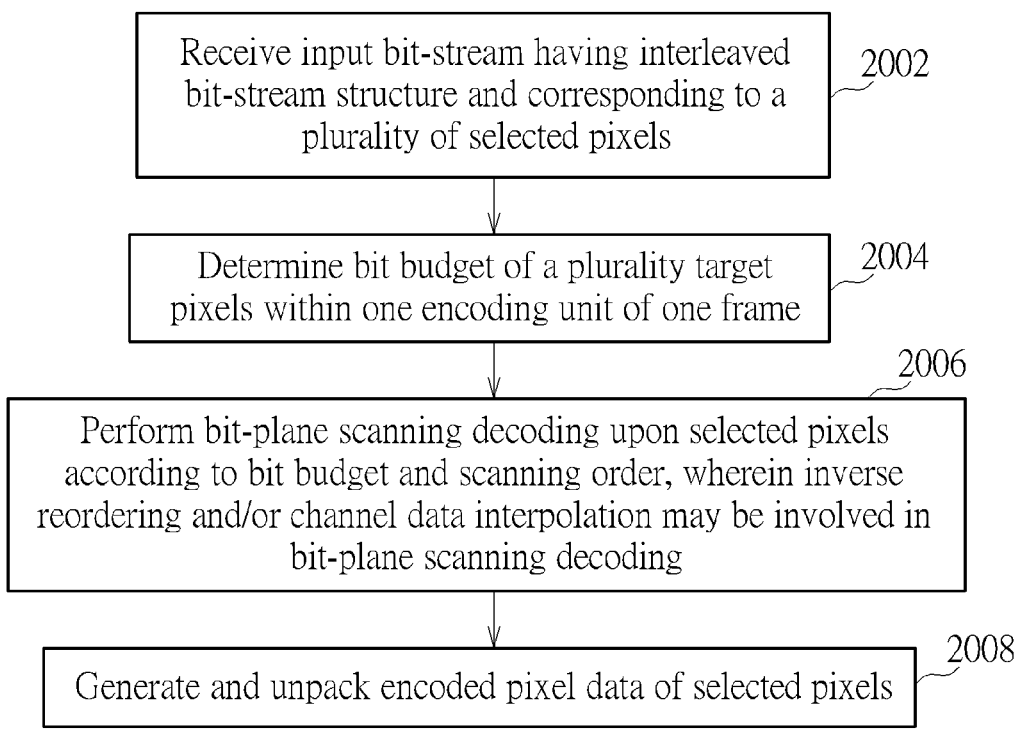
FIG. 23 is a flowchart illustrating an image decoding method according to an embodiment of the present invention.

FIG. 23 is a flowchart illustrating an image decoding method according to an embodiment of the present invention. Provided that the result is substantially the same, the steps are not required to be executed in the exact order shown in FIG. 23. The image decoding method may be employed by the image decoding apparatus 104 shown in FIG. 1, and can be briefly summarized as follows.

Step 2002: Receive an input bit-stream having an interleaved bit-stream structure and corresponding to a plurality of selected pixels.

Step 2004: Determine a bit budget (e.g., $BB_{EU}$) of a plurality target pixels within one encoding unit of a frame.

Step 2006: Perform bit-plane scanning decoding upon the selected pixels according to the bit budget and a scanning order, wherein the selected pixels to be decoded are all of the target pixels, or the selected pixels to be decoded are only a portion of the target pixels. Besides, inverse reordering (e.g., inverse pixel reordering and/or inverse color channel reordering) and/or channel data interpolation may be performed during the bit-plane scanning decoding.

Step 2008: Generate and unpack encoded pixel data of the selected pixels, wherein the bit-plane scanning coding fills partial bits of decoded pixel data of each selected pixel with encoded pixel data of the selected pixel.

As a skilled person can readily understand details of each step shown in FIG. 23 after reading above paragraphs directed to the image decoding apparatus 104, further description is omitted here for brevity. It should be noted that a decoder-side rounding operation may be performed to improve the decoding accuracy, where no encoder-side rounding operation is required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image encoding method, comprising:
receiving a plurality of target pixels within a frame, wherein pixel data of each target pixel has at least one color channel data corresponding to at least one color channel;
determining a bit budget of the target pixels; and
performing bit-plane scanning coding upon selected pixels according to the bit budget and a scanning order, and accordingly generating encoded pixel data of the selected pixels as encoded data of the target pixels, wherein the selected pixels are derived from the target pixels, and the bit-plane scanning coding extracts partial bits of pixel data of each selected pixel as encoded pixel data of the selected pixel, and a number of the partial bits extracted from the pixel data of the selected pixel is smaller than a number of all bits of the pixel data of the selected pixel.

2. The image encoding method of claim 1, wherein all of the target pixels are selected as the selected pixels to be encoded.

3. The image encoding method of claim 2, further comprising:
reordering the target pixels or color channels to set the selected pixels.

4. The image encoding method of claim 1, wherein only a portion of the target pixels is selected as the selected pixels.

5. The image encoding method of claim 4, further comprising:
discarding at least a portion of one color channel data corresponding to one color channel of at least one selected pixel before performing the bit-plane scanning coding upon the selected pixels.

6. The image encoding method of claim 5, wherein a number of selected pixels each having discarded color channel data corresponding to a first color channel is different from a number of selected pixels each having discarded color channel data corresponding to a second color channel different from the first color channel.

7. The image encoding method of claim 5, further comprising:
before the discarding step is performed, reordering the target pixels or color channels to set the selected pixels.

8. The image encoding method of claim 4, further comprising:
discarding at least a portion of one color channel data corresponding to one color channel of at least one target pixel before performing the bit-plane scanning coding upon the selected pixels.

9. The image encoding method of claim 8, wherein a number of target pixels each having discarded color channel data corresponding to a first color channel is different from a number of target pixels each having discarded color channel data corresponding to a second color channel different from the first color channel.

10. The image encoding method of claim 8, further comprising:
reordering the target pixels or color channels obtained after the discarding step to set the selected pixels.

11. The image encoding method of claim 1, wherein the bit-plane scanning coding allocates a bit budget for each color channel data of each color channel of each selected pixel according to the scanning order.

12. The image encoding method of claim 11, wherein before extracting partial bits of each color channel data of each color channel of each selected pixel according to the allocated bit budget, the bit-plane scanning coding adds a non-zero binary value to one bit of the color channel data that is not included in the partial bits to be extracted based on the allocated bit budget, and selectively performs range clipping to avoid overflow of the color channel data.

13. The image encoding method of claim 1, wherein the scanning order comprises at least one of:
in one color channel data of one color channel of one selected pixel, from a most significant bit plane to a least significant bit plane;
in one bit plane, from a first selected pixel to a last selected pixel; and
in one selected pixel, from a first color channel to a last color channel.

14. The image encoding method of claim 1, wherein encoded pixel data of each selected pixel includes one extracted bit stream corresponding to each color channel of the selected pixel and serving as one color channel bit-stream segment; and the image encoding method further comprises:
concatenating color channel bit-stream segments of a same selected pixel into a bit-stream portion; and
concatenating bit-stream portions of different selected pixels into an output bit-stream.

15. The image encoding method of claim 1, wherein encoded pixel data of each selected pixel includes one extracted bit stream corresponding to each color channel of the selected pixel; and the image encoding method further comprises:
packing extracted bit-streams of a same color channel of different selected pixels into a plurality of color channel bit-stream segments each having a same predetermined size; and
concatenating color channel bit-stream segments of different color channels into an output bit-stream.

16. An image decoding method, comprising:
receiving an input bit-stream corresponding to a plurality of selected pixels;
determining a bit budget of a plurality of target pixels within a frame, wherein the selected pixels are derived from the target pixels; and
performing bit-plane scanning decoding upon the selected pixels according to the bit budget and a scanning order, and accordingly generating decoded pixel data of the target pixels based on decoded pixel data of the selected pixels, wherein decoded pixel data of each target pixel has at least one color channel data corresponding to at least one color channel, the bit-plane scanning decoding at least fills partial bits of decoded pixel data of each selected pixel with encoded pixel data of the selected pixel, a number of the partial bits of the decoded pixel data of the selected pixel is smaller than a number of all bits of the decoded pixel data of the selected pixel, and the partial bits of the decoded pixel data of the selected pixel are identical to bits of the encoded pixel data of the selected pixel, respectively.

17. The image decoding method of claim 16, wherein the selected pixels to be decoded are all of the target pixels.

18. The image decoding method of claim 17, wherein the step of generating the decoded pixel data of the target pixels based on the decoded pixel data of the selected pixels comprises:
performing inverse reordering upon the selected pixels or color channels to set the target pixels.

19. The image decoding method of claim 16, wherein the selected pixels to be decoded are only a portion of the target pixels.

20. The image decoding method of claim 19, wherein the step of generating the decoded pixel data of the target pixels based on the decoded pixel data of the selected pixels comprises:
performing interpolation to recover at least a portion of one color channel data corresponding to one color channel of at least one selected pixel.

21. The image decoding method of claim 20, wherein a number of selected pixels each having recovered color channel data corresponding to a first color channel is different from a number of selected pixels each having recovered color channel data corresponding to a second color channel different from the first color channel.

22. The image decoding method of claim 20, wherein the step of generating the decoded pixel data of the target pixels based on the decoded pixel data of the selected pixels further comprises:
performing inverse reordering upon the selected pixels or color channels to set the target pixels after the step of the performing interpolation is performed.

23. The image decoding method of claim 19, wherein the step of generating the decoded pixel data of the target pixels based on the decoded pixel data of the selected pixels comprises:
performing interpolation to recover at least a portion of one color channel data corresponding to one color channel of at least one target pixel.

24. The image decoding method of claim 23, wherein a number of target pixels each having recovered color channel data corresponding to a first color channel is different from a number of target pixels each having recovered color channel data corresponding to a second color channel different from the first color channel.

25. The image decoding method of claim 23, wherein the step of generating the decoded pixel data of the target pixels based on the decoded pixel data of the selected pixels further comprises:
performing inverse reordering upon the selected pixels or color channels to set the target pixels before the step of performing the interpolation is performed.

26. The image decoding method of claim 16, wherein the bit-plane scanning decoding allocates a bit budget for each color channel data of each color channel of each selected pixel according to the scanning order.

27. The image decoding method of claim 16, wherein the scanning order comprises at least one of:
in one color channel data of one color channel of one selected pixel, from a most significant bit plane to a least significant bit plane;
in one bit plane, from a first selected pixel to a last selected pixel; and
in one selected pixel, from a first color channel to a last color channel.

28. The image decoding method of claim 16, wherein the input bit-stream is composed of a plurality of bit-stream portions that are concatenated, and each of the bit-stream portions contains information corresponding to one selected pixel only.

29. The image decoding method of claim 16, wherein the input bit-stream is composed of a plurality of color channel bit-stream segments of different color channels that are concatenated, and color channel bit-stream segments of a same color channel have a same predetermined size.

30. The image decoding method of claim 16, wherein the bit-plane scanning decoding initially resets all bits of the decoded pixel data of each selected pixel to a first binary value; and after filling the partial bits of the decoded pixel data of each selected pixel with the encoded pixel data of the selected pixel, the bit-plane scanning decoding further performs a rounding operation to assign a second binary value to one of remaining bit(s) of the decoded pixel data of the selected pixel.

31. An image encoding apparatus, comprising:
- an input port, arranged to receive a plurality of target pixels within a frame, wherein pixel data of each target pixel has at least one color channel data corresponding to at least one color channel; and
- an encoder, arranged to determine a bit budget of the target pixels, and further arranged to perform bit-plane scanning coding upon selected pixels according to the bit budget and a scanning order, and accordingly generate encoded pixel data of the selected pixels as encoded data of the target pixels, wherein the selected pixels are derived from the target pixels, and the bit-plane scanning coding extracts partial bits of pixel data of each selected pixel as encoded pixel data of the selected pixel, and a number of the partial bits extracted from the pixel data of the selected pixel is smaller than a number of all bits of the pixel data of the selected pixel.

32. An image decoding apparatus, comprising:
- an input port, arranged to receive an input bit-stream corresponding to a plurality of selected pixels, wherein the selected pixels are derived from a plurality of target pixels within a frame; and
- a decoder, arranged to determine a bit budget of the target pixels, and further arranged to perform bit-plane scanning decoding upon the selected pixels according to the bit budget and a scanning order, and accordingly generate decoded pixel data of the target pixels based on decoded pixel data of the selected pixels, wherein decoded pixel data of each target pixel has at least one color channel data corresponding to at least one color channel, the bit-plane scanning decoding at least fills partial bits of decoded pixel data of each selected pixel with encoded pixel data of the selected pixel, a number of the partial bits of the decoded pixel data of the selected pixel is smaller than a number of all bits of the decoded pixel data of the selected pixel, and the partial bits of the decoded pixel data of the selected pixel are identical to bits of the encoded pixel data of the selected pixel, respectively.

\* \* \* \* \*